US012706066B2

(12) United States Patent
Iverson et al.

(10) Patent No.: US 12,706,066 B2
(45) **Date of Patent: *Aug. 11, 2026**

(54) SYSTEMS AND METHODS FOR DRIVING A DISPLAY

(71) Applicant: Snap Inc., Santa Monica, CA (US)

(72) Inventors: Andrew Iverson, Portland, OR (US); Howard V. Goetz, Tigard, OR (US); Glen R. Sands, Hillsboro, OR (US); Kevin Ferguson, Beaverton, OR (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/905,797

(22) Filed: Oct. 3, 2024

(65) Prior Publication Data

US 2025/0029574 A1 Jan. 23, 2025

Related U.S. Application Data

(63) Continuation of application No. 18/542,007, filed on Dec. 15, 2023, now Pat. No. 12,154,526, which is a (Continued)

(51) Int. Cl.

*G09G 5/00* (2006.01)
*G06F 3/01* (2006.01)
*G06F 3/14* (2006.01)

(52) U.S. Cl.

CPC ............. *G09G 5/006* (2013.01); *G06F 3/013* (2013.01); *G06F 3/14* (2013.01); *G09G 2320/08* (2013.01);

(Continued)

(58) Field of Classification Search

CPC ........... G06F 3/013; G06F 3/14; G09G 5/006; G09G 2370/12; G09G 2340/0407;

(Continued)

(56) References Cited

U.S. PATENT DOCUMENTS 6,456,340 B1 9/2002 Margulis
11,580,929 B2 2/2023 Iverson et al.

(Continued)

FOREIGN PATENT DOCUMENTS

CN 103077693 A 5/2013
CN 105981369 A 9/2016

(Continued)

OTHER PUBLICATIONS

"U.S. Appl. No. 17/057,993, Corrected Notice of Allowability mailed Jan. 4, 2023", 6 pgs.

(Continued)

*Primary Examiner* — Shaheda A Abdin

(74) *Attorney, Agent, or Firm* — Schwegman Lundberg & Woessner, P.A.

(57) ABSTRACT

An image system dynamically updates drive sequences in an image system. Drive sequences are image display settings or display driving characteristics with which a display is operated. The image system may determine the drive sequence at least partially based on input from one or more sensors. For example, the image system may include sensors such as an inertial measurement unit, a light sensor, a camera, a temperature sensor, or other sensors from which sensor data may be collected. The image system may analyze the sensor data to calculate drive sequence settings or to select a drive sequence from a number of predetermined drive sequences. Displaying image content on a display includes providing the display with image data and includes operating the display with various drive sequences.

20 Claims, 14 Drawing Sheets

Related U.S. Application Data continuation of application No. 18/155,492, filed on Jan. 17, 2023, now Pat. No. 11,893,957, which is a continuation of application No. 17/057,993, filed as application No. PCT/US2019/033809 on May 23, 2019, now Pat. No. 11,580,929.

(60) Provisional application No. 62/676,061, filed on May 24, 2018.

(52) U.S. Cl.
CPC ... *G09G 2360/144* (2013.01); *G09G 2370/04* (2013.01); *G09G 2370/10* (2013.01); *G09G 2370/12* (2013.01)

(58) Field of Classification Search
CPC ....... G09G 2320/0261; G09G 2370/04; G09G 2370/10; G09G 2320/0613; G09G 2320/08; G09G 2360/144
See application file for complete search history.

(56) References Cited

U.S. PATENT DOCUMENTS

| | | | |
|---|---|---|---|
| 11,893,957 | B2 | 2/2024 | Iverson et al. |
| 2001/0045946 | A1 | 11/2001 | Huang et al. |
| 2005/0258463 | A1 | 11/2005 | Yaegashi et al. |
| 2007/0048629 | A1* | 3/2007 | Marokkey ........... G03F 7/70566 430/5 |
| 2010/0295760 | A1 | 11/2010 | Somerville |
| 2011/0242142 | A1* | 10/2011 | Hussain ................ G06F 3/1446 345/690 |
| 2013/0321500 | A1 | 12/2013 | Tsai et al. |
| 2014/0168277 | A1 | 6/2014 | Ashley et al. |
| 2014/0176614 | A1 | 6/2014 | Rosenberg et al. |
| 2015/0189190 | A1* | 7/2015 | Fung .................... H04N 13/257 348/222.1 |
| 2016/0335986 | A1 | 11/2016 | Bae et al. |
| 2017/0249920 | A1 | 8/2017 | Cook et al. |
| 2018/0053284 | A1 | 2/2018 | Rodriguez et al. |
| 2018/0081429 | A1 | 3/2018 | Akenine-Moller et al. |
| 2021/0210046 | A1 | 7/2021 | Iverson et al. |
| 2023/0230558 | A1 | 7/2023 | Iverson et al. |
| 2024/0274101 | A1 | 8/2024 | Iverson et al. |

FOREIGN PATENT DOCUMENTS

| | | | | |
|---|---|---|---|---|
| CN | 107016950 | A | 8/2017 | |
| CN | 107851415 | A | 3/2018 | |
| CN | 112567329 | A | 3/2021 | |
| CN | 112567329 | B | 8/2024 | |
| EP | 3803566 | A1 | 4/2021 | |
| JP | H0580714 | | 4/1993 | |
| JP | H05341750 | A | 12/1993 | |
| JP | H0954569 | A | 2/1997 | |
| JP | H1011035 | A | 1/1998 | |
| JP | H1198438 | | 4/1999 | |
| JP | 2000072998 | | 3/2000 | |
| JP | 2000338949 | A | 12/2000 | |
| JP | 2001034245 | A | 2/2001 | |
| JP | 2001166764 | A | 6/2001 | |
| JP | 2002149142 | A | 5/2002 | |
| JP | 2003051931 | A | 2/2003 | |
| JP | 2004017057 | | 1/2004 | |
| JP | 2005084483 | A | 3/2005 | |
| JP | 2005260651 | A | 9/2005 | |
| JP | 2006145798 | A | 6/2006 | |
| JP | 2013090109 | A | 5/2013 | |
| JP | 2013122519 | A | 6/2013 | |
| JP | 2021525399 | A | 9/2021 | |
| JP | 2024038128 | A | 3/2024 | |
| KR | 20070048629 | A * | 5/2007 | .......... H04N 7/0132 |
| KR | 20210117141 | A | 9/2021 | |
| KR | 102577965 | B1 | 9/2023 | |
| MY | 201647 | A | 3/2024 | |
| TW | I562092 | B | 12/2016 | |
| TW | 202011174 | A | 3/2020 | |
| TW | 202336566 | | 9/2023 | |
| WO | WO-2019226927 | A1 | 11/2019 | |

OTHER PUBLICATIONS

"U.S. Appl. No. 17/057,993, Final Office Action mailed Jul. 28, 2022", 18 pgs.
"U.S. Appl. No. 17/057,993, Non Final Office Action mailed Jan. 21, 2022", 18 pgs.
"U.S. Appl. No. 17/057,993, Notice of Allowance mailed Oct. 13, 2022", 10 pgs.
"U.S. Appl. No. 17/057,993, Response filed Apr. 19, 2022 to Non Final Office Action mailed Jan. 21, 2022", 16 pgs.
"U.S. Appl. No. 17/057,993, Response filed Sep. 19, 2022 to Final Office Action mailed Jul. 28, 2022", 9 pgs.
"U.S. Appl. No. 18/155,492, Corrected Notice of Allowability mailed Nov. 22, 2023", 5 pgs.
"U.S. Appl. No. 18/155,492, Non Final Office Action mailed Jul. 6, 2023", 19 pgs.
"U.S. Appl. No. 18/155,492, Notice of Allowance mailed Sep. 27, 2023", 9 pgs.
"U.S. Appl. No. 18/155,492, Preliminary Amendment filed Jan. 18, 2023", 3 pgs.
"U.S. Appl. No. 18/155,492, Response filed Sep. 19, 2023 to Non Final Office Action mailed Jul. 6, 2023", 10 pgs.
"U.S. Appl. No. 18/542,007, Corrected Notice of Allowability mailed Aug. 28, 2024", 18 pgs.
"U.S. Appl. No. 18/542,007, Corrected Notice of Allowability mailed Oct. 1, 2024", 10 pgs.
"U.S. Appl. No. 18/542,007, Notice of Allowance mailed Jul. 18, 2024", 15 pgs.
"U.S. Appl. No. 18/542,007, Preliminary Amendment filed Dec. 18, 2023", 3 pgs.
"Chinese Application Serial No. 201980034652.8, Office Action mailed Mar. 29, 2024", w/ English translation, 7 pgs.
"Chinese Application Serial No. 201980034652.8, Office Action mailed Sep. 8, 2023", w/ English Translation, 24 pgs.
"Chinese Application Serial No. 201980034652.8, Response filed Apr. 29, 2024 to Office Action mailed Mar. 29, 2024", w/ current English claims, 51 pgs.
"Chinese Application Serial No. 201980034652.8, Response filed Oct. 31, 2023 to Office Action mailed Sep. 8, 2023", w/ English claims, 20 pgs.
"European Application Serial No. 19731830.6, Communication Pursuant to Article 94(3) EPC mailed May 12, 2023", 5 pgs.
"European Application Serial No. 19731830.6, Response to Communication pursuant to Rules 161(1) and 162 EPC filed Jul. 29, 2021", 11 pgs.
"International Application Serial No. PCT/US2019/033809, International Preliminary Report on Patentability mailed Dec. 3, 2020", 8 pgs.
"International Application Serial No. PCT/US2019/033809, International Search Report mailed Sep. 9, 2019", 3 pgs.
"International Application Serial No. PCT/US2019/033809, Written Opinion mailed Sep. 9, 2019", 6 pgs.
"Japanese Application Serial No. 2021-516541, Examiners Decision of Final Refusal mailed Aug. 18, 2023", W/English Translation, 9 pgs.
"Japanese Application Serial No. 2021-516541, Final Notification of Reasons for Refusal mailed Feb. 14, 2023", w/ English Translation, 6 pgs.
"Japanese Application Serial No. 2021-516541, Final Notification of Reasons for Refusal mailed Sep. 27, 2022", w/ English Translation, 8 pgs.
"Japanese Application Serial No. 2021-516541, Notification of Reasons for Refusal mailed Feb. 22, 2022", w/ English translation, 8 pgs.

(56) References Cited

OTHER PUBLICATIONS

"Japanese Application Serial No. 2021-516541, Response filed Jul. 7, 2022 to Notification of Reasons for Refusal mailed Feb. 22, 2022", w/ English claims, 13 pgs.
"Japanese Application Serial No. 2021-516541, Response filed Dec. 20, 2022 to Final Notification of Reasons for Refusal mailed Sep. 27, 2022", w/ English Claims, 12 pgs.
"Japanese Application Serial No. 2023-219504, Examiners Decision of Final Refusal mailed Aug. 20, 2024", w/ English translation, 6 pgs.
"Japanese Application Serial No. 2023-219504, Notification of Reasons for Refusal mailed Mar. 12, 2024", w/ English Translation, 8 pgs.
"Korean Application Serial No. 10-2020-7037290, Korean Final Office Action mailed Mar. 28, 2023", W/English Translation, 7 pgs.
"Korean Application Serial No. 10-2020-7037290, Notice of Preliminary Rejection mailed Jun. 21, 2022", W/O English Translation, 8 pgs.
"Korean Application Serial No. 10-2020-7037290, Response filed Nov. 19, 2022 Notice of Preliminary Rejection mailed Jun. 21, 2022", w/o English Claims, 24 pgs.
"Taiwanese Application Serial No. 108118114, Office Action mailed Oct. 31, 2022", w/ English Translation of English Search Report, 11 pgs.
"Taiwanese Application Serial No. 112121445, Office Action mailed Mar. 18, 2024", w/ Machine English Translation, 17 pgs.
"European Application Serial No. 19731830.6, Communication Pursuant to Article 94(3) EPC mailed Oct. 22, 2024", 5 pgs.
"Taiwanese Application Serial No. 112121445, Response filed Jun. 17, 2024 to Office Action mailed Mar. 18, 2024", w/ English claims, 103 pgs.
"Japanese Application Serial No. 2023-219504, Response Filed Dec. 13, 2024 to Examiners Decision of Final Refusal mailed Aug. 20, 2024", w/ English Claims, 17 pgs.
"European Application Serial No. 19731830.6, Response Filed Sep. 8, 2023 to Communication Pursuant to Article 94(3) EPC mailed May 12, 2023", 16 pgs.
"European Application Serial No. 19731830.6, Response Filed Feb. 20, 2025 to Communication Pursuant to Article 94(3) EPC mailed Oct. 22, 2024", 4 pgs.
"European Application Serial No. 19731830.6, Communication Pursuant to Article 94(3) EPC mailed Dec. 23, 2025", 6 pgs.
"Japanese Application Serial No. 2023-219504, Office Action mailed Mar. 3, 2026", w/ English translation, 52 pgs.

* cited by examiner

600

602 CONTROL STRUCTURE HEADER

604 CONTROL STRUCTURE

| NOVA SIGNATURE | CONTROL STRUCTURE COUNT | DATA STRUCTURE COUNTS | LCOS CHANNEL CONTROL | TIMEBASE RESET DELAY | DATA DETAILS | DATA RESOLUTION | CHANNEL ID | CMD DETAILS | LUT DETAILS | SPI DETAILS | RESERVED | RESERVED | RESERVED | RESERVED |
|---|---|---|---|---|---|---|---|---|---|---|---|---|---|---|
| CMD #0 (32-BIT COMMAND) | CMD #1 | | ... | | CMD #(CMDCOUNT-1) | | CMD #(CMDCOUNT) - EMPTY | | CMD #(CMDCOUNT+1) - EMPTY | | ... | | CMD #4095 - EMPTY | |
| LUT #0 [335:0] = {16'h0, 16-BIT H3 BP HEADER, 48-BIT MUXSELECT, 256-BIT LUT CONTENT} | | | | | | | | | | | | | RESERVED | |
| LUT #1 [335:0] = {16'h0, 16-BIT H3 BP HEADER, 48-BIT MUXSELECT, 256-BIT LUT CONTENT} | | | | | | | | | | | | | RESERVED | |
| ... | | | | | | | | | | | | | RESERVED | |
| LUT #(LUTCOUNT-1) [335:0] = {16'h0, 16-BIT H3 BP HEADER, 48-BIT MUXSELECT, 256-BIT LUT CONTENT} | | | | | | | | | | | | | RESERVED | |
| LUT #(LUTCOUNT)EMPTY [335:0] = {16'h0, 16-BIT H3 BP HEADER, 48-BIT MUXSELECT, 256-BIT LUT CONTENT} | | | | | | | | | | | | | RESERVED | |
| ... | | | | | | | | | | | | | RESERVED | |
| LUT #1023 EMPTY [335:0] = {16'h0, 16-BIT H3 BP HEADER, 48-BIT MUXSELECT, 256-BIT LUT CONTENT} | | | | | | | | | | | | | RESERVED | |

FIG. 6A

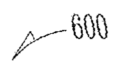

VIDEO FRAME ~ 606

SPI #0 36-BIT DATA | SPI #1 | SPI #2 | SPI #3 | ... | SPI #(SPICOUNT-2) | SPI #(SPICOUNT-1) | SPI #(SPICOUNT)-EMPTY

SPI #(SPICOUNT+1)-EMPTY | ... | SPI #254-EMPTY | SPI #255-EMPTY | DATASTRUCT DETAILS | DATASTRUCT PIXELCOUNT | DITHER KERNEL VALUES (4-BIT 4X4) | ROTATE STORAGE ADDRESSES | RESERVED

VALID==1 (IN DATASTRUCT DETAILS); DATASTRUCT #0 DATA (OPTIONAL)

... | DATASTRUCT DETAILS | DATASTRUCT PIXELCOUNT | DITHER KERNEL VALUES (4-BIT 4X4) | ROTATE STORAGE ADDRESSES | RESERVED

VALID==1 (IN DATASTRUCT DETAILS); DATASTRUCT #1 DATA (OPTIONAL)

... | DATASTRUCT DETAILS | DATASTRUCT PIXELCOUNT | DITHER KERNEL VALUES (4-BIT 4X4) | ROTATE STORAGE ADDRESSES | RESERVED

VALID==0 (IN DATASTRUCT DETAILS); DATASTRUCT DATA - IGNORED BY NOVA - USED TO INSERT GAPS INTO DATA-STRUCTURE "SLOTS" FOR GREATER CONTROL OVER STORAGE "TIME" (MOSTLY FOR 100% CW PHASE USE-CASE)

... | ... MORE DATASTRUCTS. INSPECT VALID TO KNOW IF NOVA SHOULD STORE THEM. ...

... | DATASTRUCT DETAILS | DATASTRUCT PIXELCOUNT | DITHER KERNEL VALUES (4-BIT 4X4) | ROTATE STORAGE ADDRESSES | RESERVED

VALID==1 (IN DATASTRUCT DETAILS); DATASTRUCT #DATASTRUCTCOUNT-1 DATA (OPTIONAL)

... | ONCE "DATA STRUCTURE COUNT" NUMBER OF VALID DATA-STRUCTURES HAVE BEEN PROCECESSED BY NOVA(S), THE REMAINING DATA IN THE VIDEO "FRAME" IS IGNORED.

THE REMAINING DATA MAY NOT BE AN EVEN MULTIPLE OF BIT-PLANE SIZES, SO NOVA KEEPS TRACK OF THE MIPI "RESOLUTION" (EXPECTED NUMBER OF "PIXELS") TO KNOW WHEN A FRAME IS DONE.

CONTROL STRUCTURE HEADER ~702

| NOVA SIGNATURE | CONTROL STRUCTURE COUNT | DATA STRUCTURE COUNTS | LCOS CHANNEL CONTROL | TIMEBASE RESET DELAY | DATA DETAILS | DATA RESOLUTION | CHANNEL ID | CMD DETAILS | LUT DETAILS | SPI DETAILS | RESERVED | RESERVED | RESERVED | RESERVED |
|---|---|---|---|---|---|---|---|---|---|---|---|---|---|---|
| CMD #0 (32-BIT COMMAND) | CMD #1 | | ... | | CMD #(CMDCOUNT-1) | | CMD #(CMDCOUNT) - EMPTY | | CMD #(CMDCOUNT+1) - EMPTY | | ... | | CMD #4095 - EMPTY | |
| LUT #0 [335:0] = {16'h0, 16-BIT H3 BP HEADER, 48-BIT MUXSELECT, 256-BIT LUT CONTENT} | | | | | | | | | | | | | RESERVED | |
| LUT #1 [335:0] = {16'h0, 16-BIT H3 BP HEADER, 48-BIT MUXSELECT, 256-BIT LUT CONTENT} | | | | | | | | | | | | | RESERVED | |
| ... | | | | | | | | | | | | | RESERVED | |
| LUT #(LUTCOUNT-1) [335:0] = {16'h0, 16-BIT H3 BP HEADER, 48-BIT MUXSELECT, 256-BIT LUT CONTENT} | | | | | | | | | | | | | RESERVED | |
| LUT #(LUTCOUNT)EMPTY [335:0] = {16'h0, 16-BIT H3 BP HEADER, 48-BIT MUXSELECT, 256-BIT LUT CONTENT} | | | | | | | | | | | | | RESERVED | |
| ... | | | | | | | | | | | | | RESERVED | |
| LUT #1023 EMPTY [335:0] = {16'h0, 16-BIT H3 BP HEADER, 48-BIT MUXSELECT, 256-BIT LUT CONTENT} | | | | | | | | | | | | | RESERVED | |
| SPI #0 36-BIT DATA | SPI #1 | | SPI #2 | | SPI #3 | | ... | | SPI #(SPICOUNT-2) | | SPI #(SPICOUNT-1) | | SPI #(SPICOUNT)-EMPTY | |
| SPI #(SPICOUNT+1)-EMPTY | ... | | SPI #254 - EMPTY | | SPI #255 - EMPTY | | CHANNEL ID | CMD DETAILS | LUT DETAILS | SPI DETAILS | RESERVED | RESERVED | RESERVED | RESERVED |

704 ~ FIRST CONTROL STRUCTURE

Figure 7B:
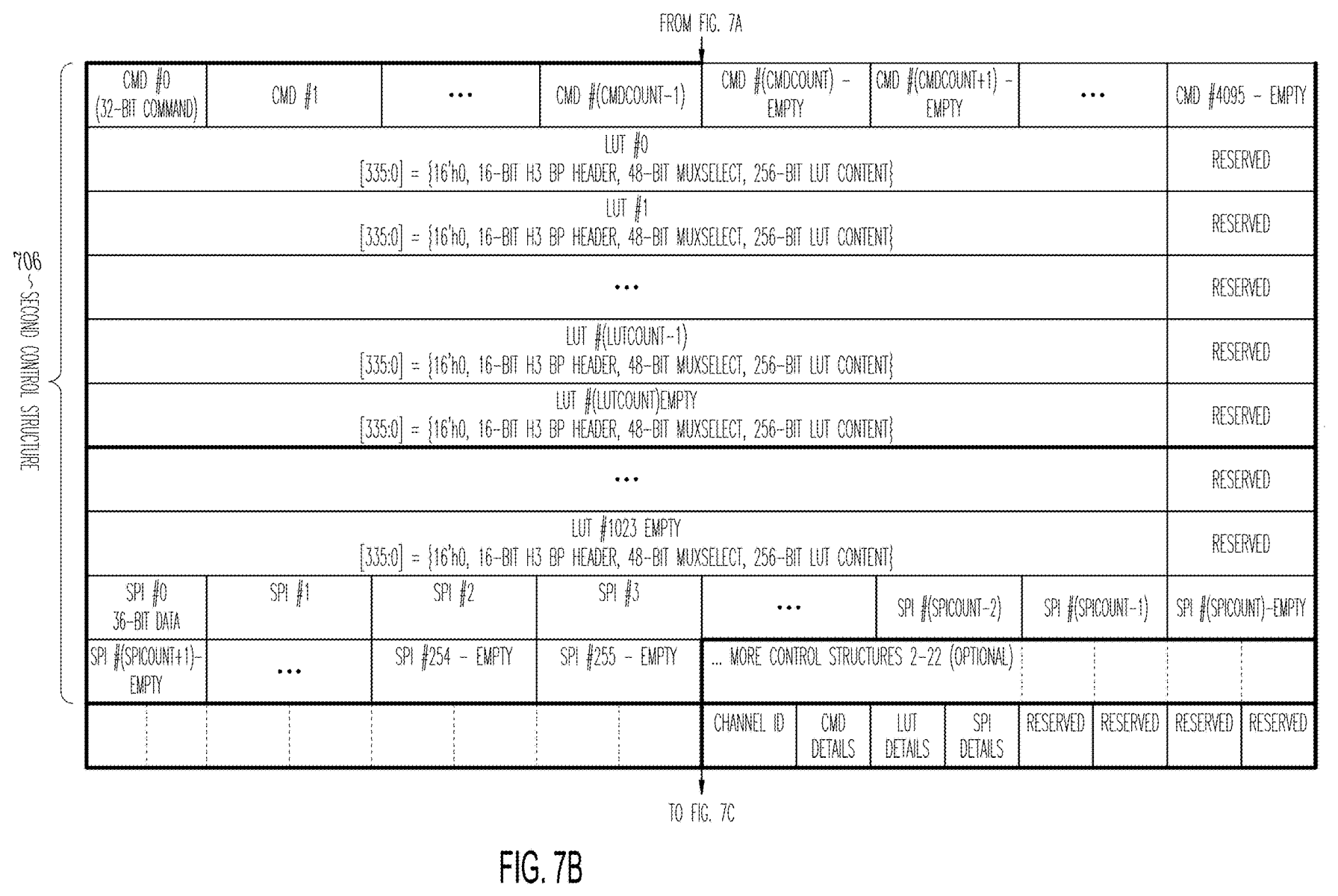

FROM FIG. 7A

| CMD #0 (32-BIT COMMAND) | CMD #1 | ... | CMD #(CMDCOUNT-1) | CMD #(CMDCOUNT) - EMPTY | CMD #(CMDCOUNT+1) - EMPTY | ... | CMD #4095 - EMPTY |
|---|---|---|---|---|---|---|---|
| LUT #0 [335:0] = {16'h0, 16-BIT H3 BP HEADER, 48-BIT MUXSELECT, 256-BIT LUT CONTENT} | | | | | | | RESERVED |
| LUT #1 [335:0] = {16'h0, 16-BIT H3 BP HEADER, 48-BIT MUXSELECT, 256-BIT LUT CONTENT} | | | | | | | RESERVED |
| ... | | | | | | | RESERVED |
| LUT #(LUTCOUNT-1) [335:0] = {16'h0, 16-BIT H3 BP HEADER, 48-BIT MUXSELECT, 256-BIT LUT CONTENT} | | | | | | | RESERVED |
| LUT #(LUTCOUNT)EMPTY [335:0] = {16'h0, 16-BIT H3 BP HEADER, 48-BIT MUXSELECT, 256-BIT LUT CONTENT} | | | | | | | RESERVED |
| ... | | | | | | | RESERVED |
| LUT #1023 EMPTY [335:0] = {16'h0, 16-BIT H3 BP HEADER, 48-BIT MUXSELECT, 256-BIT LUT CONTENT} | | | | | | | RESERVED |
| SPI #0 36-BIT DATA | SPI #1 | SPI #2 | SPI #3 | ... | SPI #(SPICOUNT-2) | SPI #(SPICOUNT-1) | SPI #(SPICOUNT)-EMPTY |
| SPI #(SPICOUNT+1)-EMPTY | ... | SPI #254 - EMPTY | SPI #255 - EMPTY | ... MORE CONTROL STRUCTURES 2-22 (OPTIONAL) | | | |

| | | | | | | | | | | | | | | | |
|---|---|---|---|---|---|---|---|---|---|---|---|---|---|---|---|
| | | | | | | | | CHANNEL ID | CMD DETAILS | LUT DETAILS | SPI DETAILS | RESERVED | RESERVED | RESERVED | RESERVED |

706 ~ SECOND CONTROL STRUCTURE

Figure 7C:
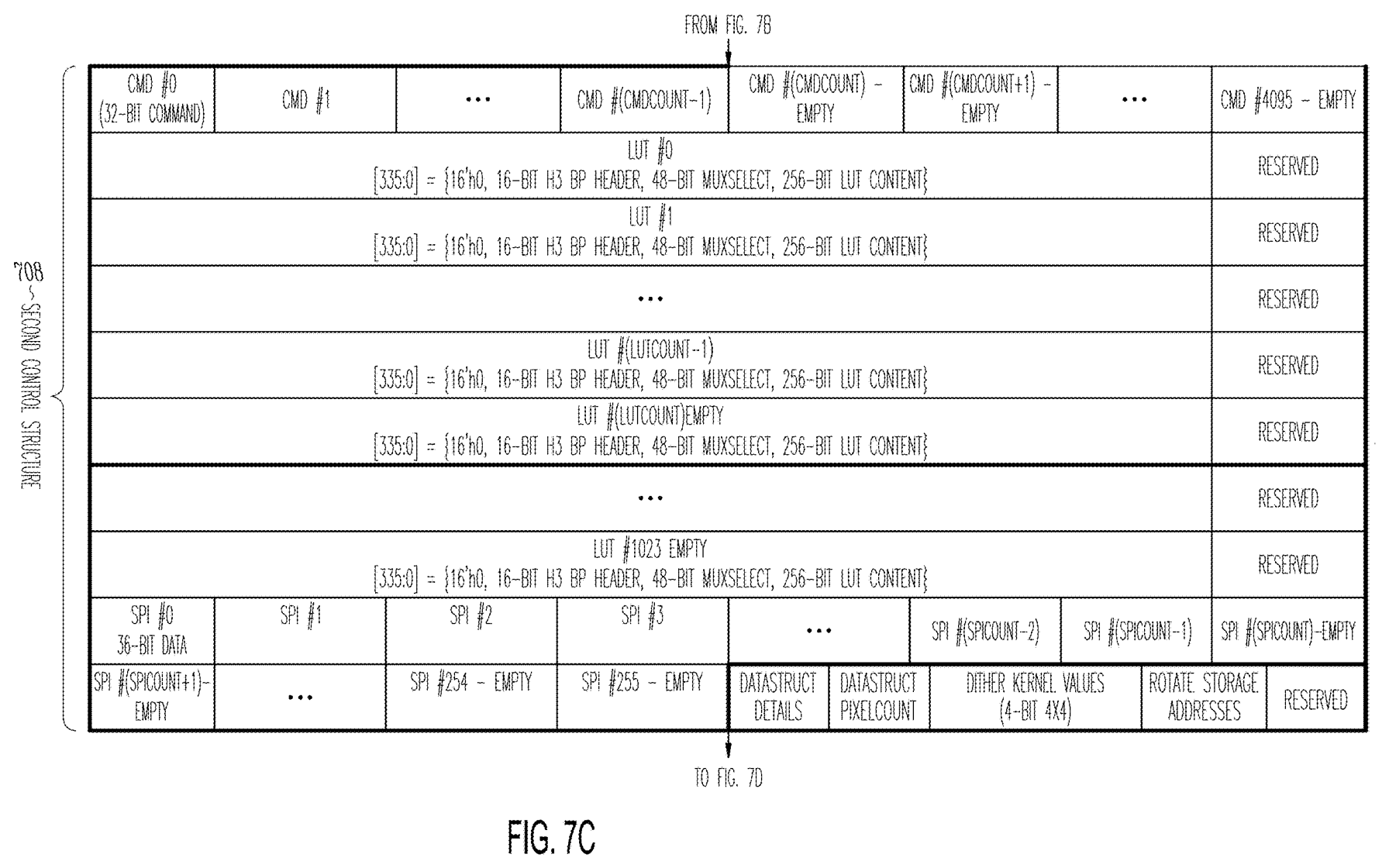

FROM FIG. 7B

| CMD #0 (32-BIT COMMAND) | CMD #1 | ... | CMD #(CMDCOUNT-1) | CMD #(CMDCOUNT) - EMPTY | CMD #(CMDCOUNT+1) - EMPTY | ... | CMD #4095 - EMPTY |
|---|---|---|---|---|---|---|---|
| LUT #0 [335:0] = {16'h0, 16-BIT H3 BP HEADER, 48-BIT MUXSELECT, 256-BIT LUT CONTENT} | | | | | | | RESERVED |
| LUT #1 [335:0] = {16'h0, 16-BIT H3 BP HEADER, 48-BIT MUXSELECT, 256-BIT LUT CONTENT} | | | | | | | RESERVED |
| ... | | | | | | | RESERVED |
| LUT #(LUTCOUNT-1) [335:0] = {16'h0, 16-BIT H3 BP HEADER, 48-BIT MUXSELECT, 256-BIT LUT CONTENT} | | | | | | | RESERVED |
| LUT #(LUTCOUNT)EMPTY [335:0] = {16'h0, 16-BIT H3 BP HEADER, 48-BIT MUXSELECT, 256-BIT LUT CONTENT} | | | | | | | RESERVED |
| ... | | | | | | | RESERVED |
| LUT #1023 EMPTY [335:0] = {16'h0, 16-BIT H3 BP HEADER, 48-BIT MUXSELECT, 256-BIT LUT CONTENT} | | | | | | | RESERVED |
| SPI #0 36-BIT DATA | SPI #1 | SPI #2 | SPI #3 | ... | SPI #(SPICOUNT-2) | SPI #(SPICOUNT-1) | SPI #(SPICOUNT)-EMPTY |
| SPI #(SPICOUNT+1)-EMPTY | ... | SPI #254 - EMPTY | SPI #255 - EMPTY | DATASTRUCT DETAILS / DATASTRUCT PIXELCOUNT | DITHER KERNEL VALUES (4-BIT 4X4) | ROTATE STORAGE ADDRESSES | RESERVED |

708 ~ SECOND CONTROL STRUCTURE

SYSTEMS AND METHODS FOR DRIVING A DISPLAY

CROSS-REFERENCE TO RELATED APPLICATION

This application is a continuation of U.S. application Ser. No. 18/542,007, filed Dec. 15, 2023, which application is a continuation of U.S. application Ser. No. 18/155,492, filed Jan. 17, 2023, now issued as U.S. Pat. No. 11,893,957, which application is a continuation of U.S. application Ser. No. 17/057,993, filed Nov. 23, 2020, now issued as U.S. Pat. No. 11,580,929, which application is a U.S. National Stage Filing under 35 U.S.C. 371 from International Application No. PCT/US2019/033809, filed on May 23, 2019, and published as WO2019/226927 on 28 Nov. 2019, which application claims the benefit of priority to Provisional Application Ser. No. 62/676,061, filed May 24, 2018, all of which are incorporated herein by reference in their entirety.

BACKGROUND OF THE INVENTION

Common image display-related characteristics include frame rate of the image data, color durations for pixels in a display, and brightness of the display, among others, which may be controlled via drive circuitry and/or software that drives a display. These display characteristics can be used to control brightness, resolution, depth perception, and other visual effects of a displayed images.

When some existing image rendering technologies are employed to reconfigure display characteristics (e.g., frame rate, brightness of the display, etc.), these existing image rendering technologies involve turning off the display or otherwise interrupting the rendering of content for display to reconfigure or update the display characteristics. Sometimes, these changes may consume an amount of time that is on the order of seconds and often require image rendering to be temporarily terminated. As result, existing techniques for reconfiguring display characteristics in an image system may not enable real-time and/or dynamic reconfiguration of display characteristics, e.g., while image data is being rendered.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 2 is an example of a simplified flow diagram of a drive scheme algorithm, in accordance with an embodiment of the present invention;

FIGS. 6A and 6B illustrate an example of a merged image frame for transmitting a drive sequence between a processor and a display driver, in accordance with an embodiment of the present invention;

Figure 7D:
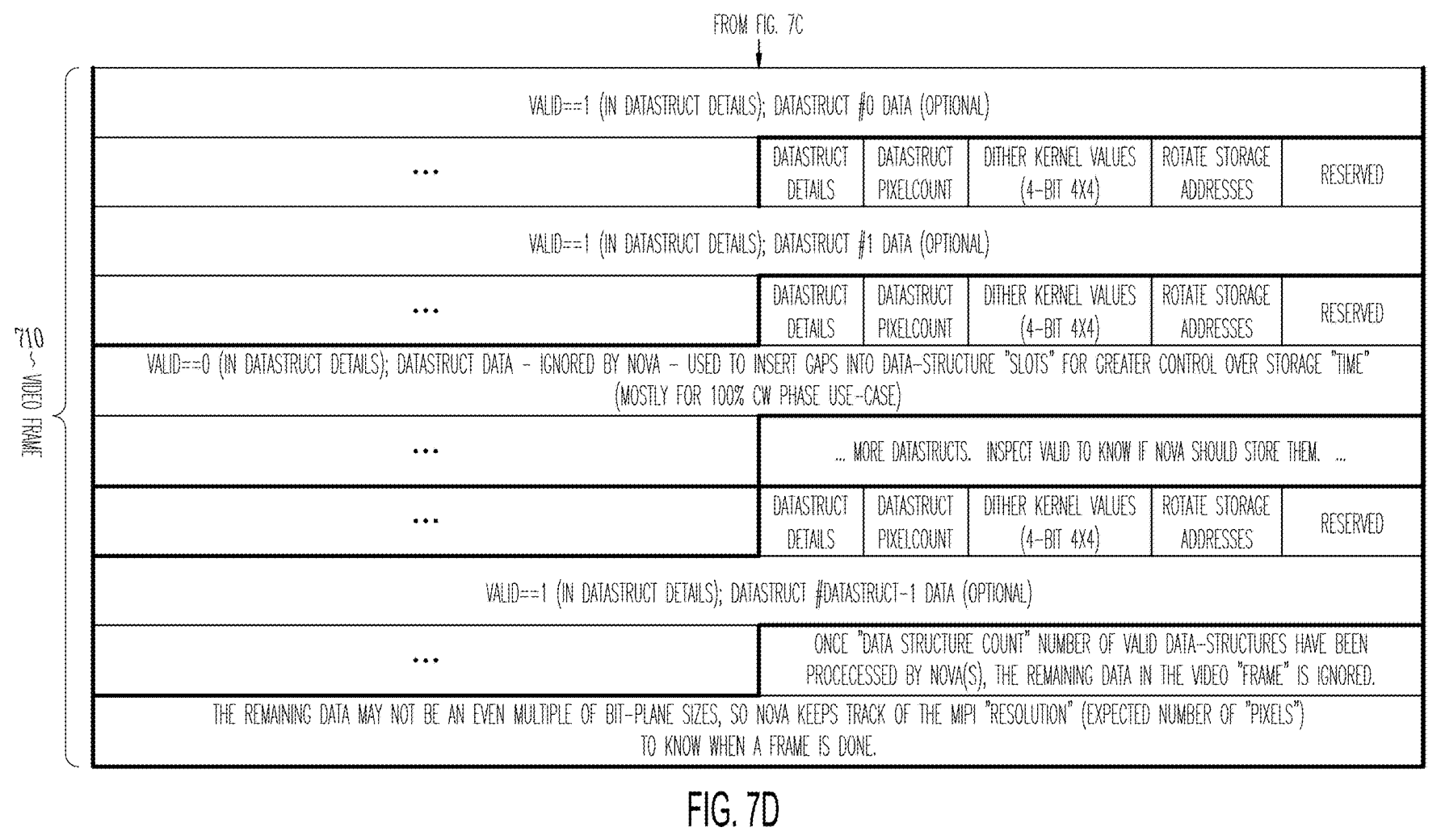

FIGS. 7A, 7B, 7C, and 7D illustrate an example of portions of a merged image frame that includes multiple examples of optional control structures for transmitting a drive sequence between a processor and a display driver, in accordance with an embodiment of the present invention.

Figure 1A:
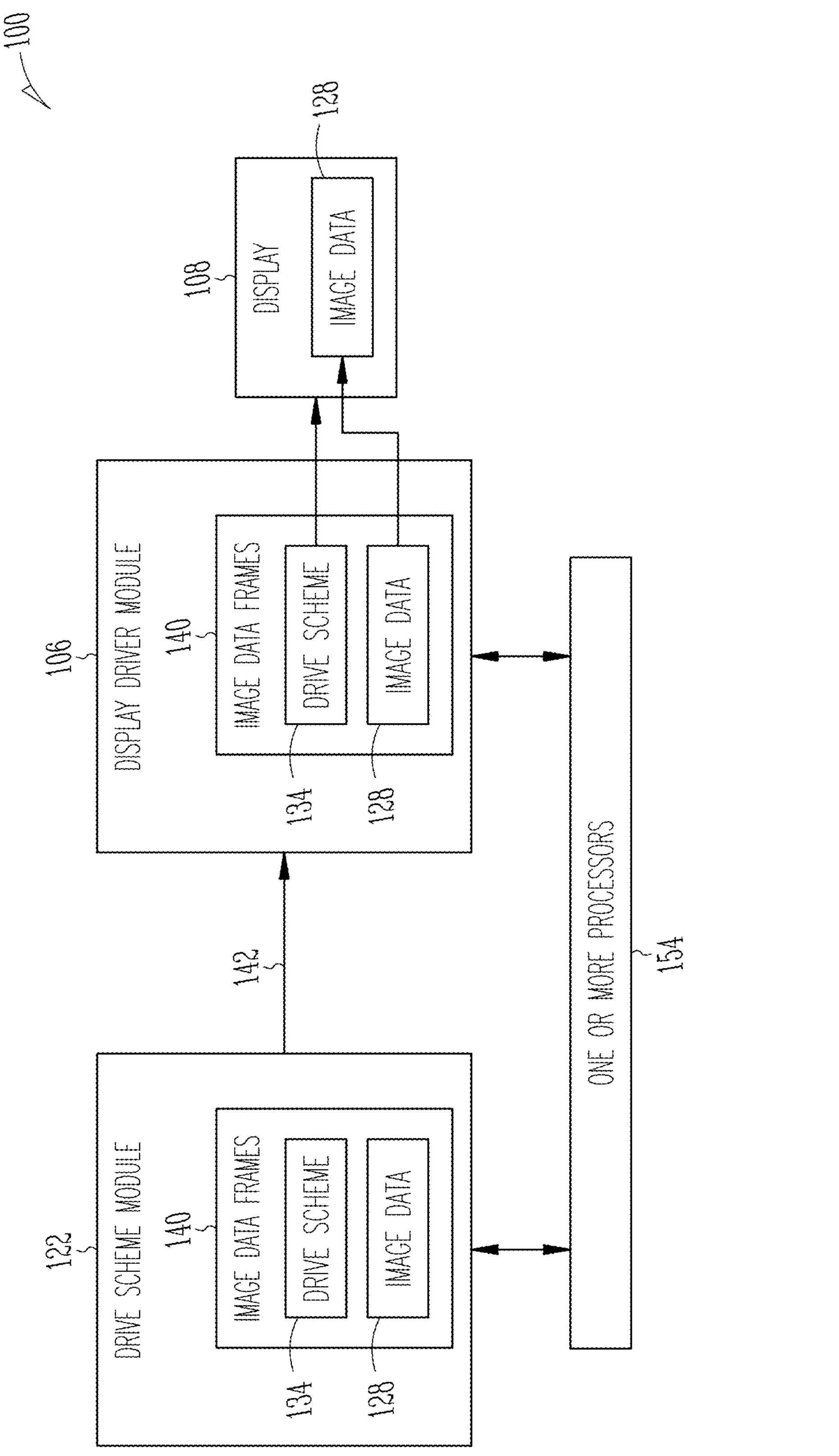
FIGS. 1A, 1B-1 and 1B-2 are an example of a diagram of an image system configured to dynamically update drive schemes, in accordance with an embodiment of the present invention.

Although the following Detailed Description will proceed with reference being made to illustrative embodiments, many alternatives, modifications and variations thereof will be apparent to those skilled in the art.

DETAILED DESCRIPTION OF THE INVENTION

In the following detailed description, reference is made to the accompanying drawings which form a part hereof and in which are shown, by way of illustration, embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B," "A or B," or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The descriptions may use the terms "embodiment" or "embodiments," which may each refer to one or more of the same or different embodiments. Furthermore, the terms "comprising," "comprises," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Various embodiments are now described with reference to the drawings, wherein like reference numerals are used to refer to like elements throughout. In the following description, for purposes of explanation, numerous specific details are set forth in order to promote a thorough understanding of one or more embodiments. It may be evident in some or all instances, however, that any embodiment described below can be practiced without adopting specific design details described below.

Disclosed herein are embodiments of an image system for dynamically reconfiguring display characteristics in an image system. When image data is rendered in a display, the display is configured in accordance with a number of display characteristics. The display characteristics may determine how the image data is perceived by a user. The display characteristics may be manipulated to enhance or otherwise alter the way in which a user experiences image data rendered on a display. The image system of the present disclosure enables dynamic (e.g., real-time and uninterrupted) reconfiguring of display and display characteristics of image data that is rendered in a display of an image system.

To illustrate, consider the advantages of dynamic reconfiguration of display characteristics in an image system implemented as an augmented reality (AR) headset. When a user wears an AR headset, the headset typically overlays graphics, text, instructions, controls or other information (i.e., overlay data) over an image or video of a real-time environment of the user. The real-time environment data may be captured by imaging (via a still, video, panoramic, or other camera), and when a user moves his head left, right, up, or down, the image overlay data is also updated, such that the overlay data also, accordingly, pans left, right, up, or down in the user's environment. When a user moves his head left, right, up, or down, the real-time environment data may also be updated. Using the ability to dynamically reconfigure display characteristics (e.g., display characteristics of still or video images), an AR headset may dim areas (e.g., change the brightness or grayscale levels of groups of pixels) of the headset display that a user's eyes are not focused on and may increase the brightness of areas of the headset display that a user's eyes are focused on. Similarly, the AR headset may reduce the resolution and/or frame-rate of image data in areas of the headset display that a user's eyes are not focused on and may increase the resolution and/or frame-rate of image data in areas of the headset display that a user's eyes are focused on. Because the reconfiguration of display characteristics is performed dynamically and without interruption of the displaying of image content to the user, the reconfiguration of the display characteristics may appear seamless to the user and may be used to enhance the user's overall quality of visual experience. Furthermore, as a tangential benefit, adjusting the brightness, grayscale level, resolution, and/or frame-rate of focal points or locations of the headset display (corresponding to pixels of the headset display), in accordance with a user's preferences (e.g., predetermined or based on data regarding the user's actual, known, or expected environment) may result in, for example, reduced power consumption by the headset display and/or improved visibility to portions of an image focused on by a user of the headset display. These example features are described in detail hereafter in the context of embodiments of dynamically reconfiguring display characteristics, by merging a drive scheme with image data and transmitting the drive scheme with the image data to a display driver (for example, display software module and/or hardware).

As used herein, the terms "drive scheme" and "drive sequence" are used interchangeably and represent a method, in accordance with the present invention, by which display characteristics, which are used to display image data in a display, are determined or changed. The terms "drive scheme" and "drive sequence" may also be used to operate and/or configure the display, and may include settings for display modes of operation, power levels and timing characteristics that are applied to a display to cause the display to display image data in a particular manner.

Figures 1, 1B:
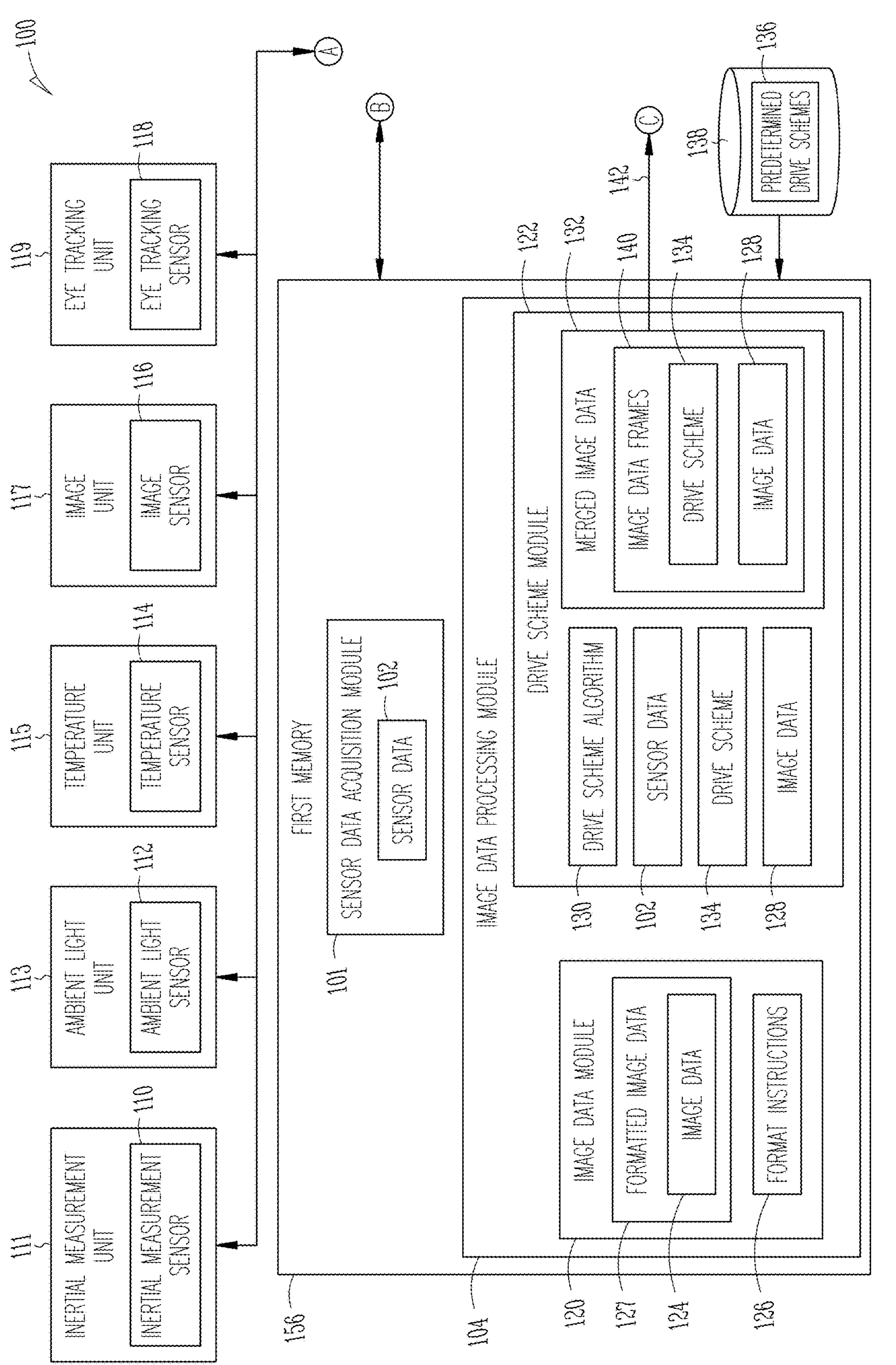

FIGS. 1A and 1B illustrate an example implementation of an image system 100 that is configured to dynamically reconfigure display characteristics, consistent with embodiments of the present disclosure. The image system 100 may dynamically reconfigure, update, institute, initiate, adjust, change, and/or modify display characteristics to provide uninterrupted viewing of image data while adjusting the way the image data is rendered in the display. Adjusting how the image data is rendered in the display enables dynamic customization of a user's experience with the image data. The dynamic customization of the user's experience with the image data enables, for example, two different users to have different experiences with the same image content, based on, for example, changes in user behavior or changes in environmental variables that are collected or sensed, by the image system 100 or that are predetermined for a particular user, a particular user's environment, and/or a particular environment in which the display device is or will be used. Each of these features and aspects of the image system 100 is described in further detail below.

FIG. 1A illustrates simplified view of the image system 100 that is configured to dynamically reconfigure display characteristics, consistent with embodiments of the present disclosure. To support dynamic reconfiguration of display characteristics, the image system 100 may include a drive scheme module 122, a display driver module 106, and a display 108.

The drive scheme module 122 may be configured to combine image data 128 with a drive scheme 134 (i.e., display characteristics) into image data frames 140. As discussed above, the drive scheme 134 (i.e., the display characteristics) may include settings that reconfigure, update, institute, initiate, adjust, change, and/or modify the display characteristics for the display 108. The image data 128 may include data values representative of a frame or an array of pixel values. The image data 128 is merged or combined with the drive scheme 134 into the image data frames 140, so the settings included in the drive scheme 134 may be transmitted to the display driver module 106 without interrupting the transmission of the image data 128. The image data frames 140 may be formatted in accordance with, for example, one or more MIPI ("mobile industry processor interface") or modified-MIPI interfaces or communication protocols. The drive scheme module 122 may be configured to transmit the image data frames 140 to the display driver module 106 over a communications channel 142 (e.g., a conductive bus, a network, a wireless interface, etc.). As described below, in the description associated with FIG. 1B, the drive scheme module 122 may include additional features and may be configured to define or select the drive scheme 134 at least partially based on information received from one or more sensors.

The display driver module 106 may be configured to operate the display 108 using the image data frames 140 received from the drive scheme module 122. The display driver module 140 may use information (e.g., the drive scheme 134) contained within the image data frames 140 to operate the display 108. The display driver module 140 may separate or parse the image data 128 and the drive scheme 134 from the image data frames 140. The display driver module 140 may temporarily store the image data 128 and the drive scheme 134. The display driver module 140 may use the display characteristics contained within the drive scheme 134 to configure the operation of the display 108, and the display driver module 140 may provide the image data 128 to the display 108 to be displayed with the display characteristics from the drive scheme 134. By receiving, parsing, and applying the drive scheme 134 to the display 108, the display driver module 140 supports dynamic reconfiguration of display characteristics with the display 108. As described below, in the description associated with FIG. 1B, the display driver module 140 may include additional features to facilitate dynamic reconfiguration of display characteristics with the display 108.

The display driver module 106 enables individualized implementations of drive scheme 134 selection and/or definition. Because the display driver module 106 may be configured to receive and interpret the display characteristics or display parameters (e.g., resolution, power levels, etc.) contained in the drive scheme 134, developers may create unique applications that define the drive scheme 134. In other words, the drive scheme module 122 may be implemented as a process, software application, or circuitry that is independent of the display driver module 106, allowing one or more developers to update the drive scheme 134 in accordance with their preferences. This characteristic of the display driver module 106 and the drive scheme 134 enables varied and customized applications of the dynamic reconfiguration of display characteristics that is supported by the image system 100.

The one or more processors 154 may include a first processor that executes instructions for the drive scheme module 122 and may include a second processor that executes instructions for the display driver module 106, according to an embodiment. The first processor and the second processor may be implemented as two different types of processors. The one or more processors 154 may include a GPU ("graphics processing unit"), an SoC ("system on a chip"), a CPU ("central processing unit"), a DSP ("digital signal processor"), an ASIC ("application specific integrated circuit"), or the like.

FIG. 1B illustrates additional potential features that the image system 100 may include, to support dynamic reconfiguration of display characteristics, in accordance with embodiments of the disclosure. The image system 100 may include software modules, for example, a sensor data acquisition module 101, image data processing module 104, the display driver module 106, and the display 108, according to an embodiment. These components may be implemented as one or more of a number of devices.

The sensor data acquisition module 101 may obtain, receive and/or store sensor data 103 that may be acquired from a variety of sensors, by the image system 100, and may include at least one storage and/or memory device. As described below in association with the drive scheme module 122, the image system 100 may use the sensor data acquisition module 101 to select or define display characteristics transmitted between the drive scheme module 122 and the display driver module 106. The sensor data acquisition module 101 may include data from an inertial measurement sensor 110, an ambient light sensor 112, a temperature sensor 114, an image sensor 116, and an eye tracking sensor 118, as specific illustrative and non-exhaustive examples of sensors. Other sensors may also be used.

The inertial measurement unit 111 is a device that measures one or more of force, angular rate, and magnetic fields. As understood by one of ordinary skill in the art, the inertial measurement unit 111 may include one or more accelerometers, gyroscopes, or other inertial measurement sensors 110 to measure acceleration and/or a change of position of the image system 100.

The ambient light unit 113 may detect quantities of light levels in the environment in which the image system 100 is operated. The ambient light unit 113 may include an ambient light sensor 112 to generate sensor data. The ambient light unit 113 may be implemented with a low-resolution (e.g., 1.3 megapixel) image sensor that is configured to sense light levels and provide a number that is representative of the quantity of light detected in the user's environment. The ambient light unit 113 may be a 1.3, 2, 3, 5, or 8 megapixel CMOS image sensor or CCD image sensor, such as those that are manufactured by Sony, ON Semiconductor, Samsung, Sharp, Omnivision, or the like. The ambient light unit 113 may include another type of ambient light sensor or may have another pixel resolution, as is understood by those of ordinary skill in the art.

The temperature unit 115 may include the temperature sensor 114 and may be configured to detect the temperature of the display and/or environment in which the image system 100 is operated. The temperature unit 115 may be implemented with a thermistor, a single wire digital temperature sensor, or other type of temperature sensor as known to those of ordinary skill in the art.

The image unit 117 may include the image sensor 116 and may acquire image data from the environment in which the image system 100 is operated. The image unit 117 may acquire successive images at periodic intervals (i.e., a framerate) to generate image data. The image unit 117 may be directed away from a user of the image system 100, to capture image data from the environment in which the image system 100 is operated. The image unit 117 may include a 1.3, 2, 3, 5, or 8 megapixel CMOS image sensor or CCD image sensor, such as those that are manufactured by Sony, ON Semiconductor, Samsung, Sharp, Omnivision, or the like. The image unit 117 may include another type of image sensor or may have another pixel resolution, as is understood by those of ordinary skill in the art.

The eye tracking unit 119 may include the eye tracking sensor 118 and may acquire image data from a user who that operates the image system 100. The eye tracking unit 119 may acquire successive images at periodic intervals to generate image data. The eye tracking unit 119 may be positioned within the image system 100 to be user-oriented, to facilitate acquiring image data of a user's eyes. The eye tracking unit 119 may include a 1.3, 2, 3, 5, or 8 megapixel CMOS image sensor or CCD image sensor, such as those that are manufactured by Sony, ON Semiconductor, Samsung, Sharp, Omnivision, or the like. The eye tracking unit 119 may include another type of image sensor or may have another pixel resolution, as is understood by those of ordinary skill in the art.

The sensor data 102 that is acquired by the sensor data acquisition module 101 represents data that may be acquired from one or more of the inertial measurement unit 111, the ambient light unit 113, the temperature unit 115, the image unit 117, and/or the eye tracking unit 119, directly from sensors 110, 112, 114, 116, and/or 118, as described above and as is understood by those of ordinary skill in the art. In an embodiment of the present invention, each sensor unit 111, 113, 115, 117, 119 may include a storage and/or memory device. In an embodiment of the present invention, a sensor 110, 112, 114, 116, or 118 may be incorporated within its corresponding sensor unit 111, 113, 115, 117, 119, or external to a sensor unit. For example, an inertial measurement sensor 110 may be positioned or incorporated into inertial measurement unit 111.

The image data processing module 104 includes modules (i.e., software modules) that may be used to define or select display characteristics, at least partially based on the sensor data acquisition module 101, the sensor data 102, and/or sensors 110, 112, 114, 116, and 118 discussed above. The image data processing module 104 is configured to combine image data with display characteristics, to enable dynamic reconfiguration of display characteristics, without interrupting the displaying of image data to a user of the display. To support this functionality, the image data processing module 104 may include an image data module 120 and the drive scheme module 122.

In an embodiment of the present invention, the image data module 120 may include circuitry and/or software modules that generate instructions to acquire and format image data. In an embodiment of the present invention, the image data module 120 may itself acquire and format the image data. For example, the image data module 120 may acquire and/or receive image data 124 (e.g., raw image data) and apply format instructions 126 to generate formatted image data 127, according to an embodiment. The image data module 120 may cause the image system 100 to acquire the image data 124 from one or more of the image sensors that generate at least part of the sensor data 102. The image data module 120 may cause the image system 100 to acquire the image data 124 from one or more other sources, such as but not limited to, downloads over the Internet, received from a wireless connection (e.g., Wi-Fi, LTE, etc.), received from a storage device (e.g., a hard disk drive, a solid-state drive, etc.), read from memory (e.g., random access memory), or the like, as is understood by one of ordinary skill in the art.

The image data module 120 may receive the image data 124 in one or more image formats and may execute the format instructions 126 to convert the image data 124 into one or more other image formats. The image data 124 may include, for example, red, green, blue (RGB) values for each pixel of each image that make up the image data, as is known to those skilled in the art. A non-exhaustive list of image formats that the image data 124 may be converted from and which the formatted image data 127 may be formatted to, may include, but are not limited to, VP8, VP9, AV1, VP6, Sorenson Spark, H.264, H.262, MPEG-1, MPEG-2, Theora, Dirac, MPEG-4, windows media image, RealVideo, H.263, Adobe Flash Platform, and any other image format known to those of ordinary skill in the art. The image data module 120 may use one or more image data conversion algorithms that are commercially available, open-source, or otherwise developed, according to an embodiment.

According to an embodiment of the invention, the format instructions 126 may cause the image data module 120 to apply a specific pixel value format the image data 122. Examples of pixel value formats include bit-plane format, nibble format, and byte format. Each of these format types utilize slightly different techniques for managing the color components of individual pixels that constitute an image.

The bit-plane format may include, for example, bit 7 of all the red component of all the pixels in the image data pulled out image data. These red bits may then be packed together in memory, and this process may be repeated for each bit in all colors.

The nibble format represents 4 bits of information for each color of each pixels (e.g., 4 bits for red, 4 bits for green, 4 bits for blue). Nibble formatted data may be packed together in memory so that a single pixel's upper 4-bits of red data (as an example) are separated from other image data, and those 4 bits may be stored in a frame-buffer in a contiguous manner. The process is repeated until all the red information has been extracted and packed together contiguously. The process may then be repeated for green and blue pixels.

The byte format process is similar to the nibble process, however, all 8-bits of the red data (for example) may be extracted and packed separately and contiguously. Similarly, the process may be repeated for the green and blue. Each pixel may be represented with greater than 8-bits per color, with or without dummy bits for alignment reasons.

The drive scheme module 122 may define or select a drive scheme 134 to apply to image data 128, at least partially based on the sensor data 102. The drive scheme module 122 may merge the drive scheme 134 with image data 128 to enable dynamic reconfiguration of display characteristics in the display 108. As used herein, the terms "drive scheme" and "drive sequence" are used interchangeably and represent display characteristics that are used to display image data in the display 108. Display characteristics that may constitute a drive scheme 134 include, but are not limited to, signal modulation characteristics, color durations for pixels, frame-rate, color sub-frame rate, bit-depth, color sequential duty-cycle (illumination efficiency), timing, color-gamut, gamma, brightness, persistence, drive-voltages, illumination timing, and illumination intensity, the timing of individual bit-planes sent to the display (these may determine when a liquid crystal display changes state for each gray-level, which may be adjusted according to the bit-depth and temperature), LookUpTables (LUTs) which may determine which liquid crystal display state changes happen for each possible gray-level, and the serial port interface (SPI) commands (including timing and literal values for various SPI commands that are sent to the display or other system components, which are all image characteristics understood by those of ordinary skill in the art.

To define or select a drive scheme and to merge the drive scheme with image data, the drive scheme module 122 may execute a drive scheme algorithm 130 to generate merged image data 132. An embodiment of a method of operation for the drive scheme algorithm 130 is described below in association with the method 200 (shown in FIG. 2).

The drive scheme algorithm 130 may cause the image system 100 to define or select a drive scheme 134, at least partially based on the sensor data 102 or the sensor data acquisition module 101. As discussed above, examples of the sensor data 102 include, but are not limited to, data from the inertial measurement sensor 110, data from the ambient light sensor 112, data from the temperature sensor 114, data from the image sensor 116, and data from the eye tracking sensor 118.

The drive scheme algorithm 130 defines the drive scheme 134, based on the sensor data 102, according to an embodiment. The drive scheme algorithm 130 defines the drive scheme 134, based on the sensor data 102, by mapping predetermined sensor data characteristics with predetermined display characteristics. For example, data from the eye tracking sensor 118 may indicate that a user of the image system 100 is looking at a left visible area of the display 108. A user's eyes looking to the left could be a predetermined sensor data characteristic that is mapped to a predetermined display characteristic, such as decrease the resolution of a right visible area of the display 108 and increase the resolution of the left visible area of the display 108. Other predetermined sensor characteristics may be mapped to correspond with other display characteristics, so that combinations of values of sensor data 102 from the sensors 110, 112, 114, 116, and 118 results in combinations of display characteristics that formulate a drive scheme 134. The drive scheme algorithm 130 may also define the drive scheme 134, at least partially based on one or more modes or settings. An example mode or setting may include power saving mode, 3D enhancement mode, augmented reality (AR) mode, virtual reality (VR) mode, and the like.

The drive scheme algorithm 130 selects the drive scheme 134 from predetermined drive schemes 136, at least partially based on the sensor data 102 or the sensor data acquisition module 101, according to an embodiment. The predetermined drive schemes 136 may be stored within the image system 100 in a data store 138 (e.g., a database, a data structure, a hard disk drive, etc.). The drive scheme algorithm 130 may select the drive scheme 134 based on predetermined drive schemes 136 that are associated with, for example, low/bright light levels, user eye direction (eyes looking to the left, right, up, or down, etc.), increased/decreased temperature, movement (up, down, left, right) of the image system 100, and other sensor data characteristics.

The drive scheme module 122 merges the drive scheme 134 with image data 128 using techniques that do not interrupt the delivery of the image data 128 to the display driver module 106. The image data 128 may include the image data 124 and/or the formatted image data 127. The merged image data 132 may be transmitted as a series of image data frames 140. Data frames are commonly used in digital communications and refer to an array of rows and columns of information that have a repeatable format that enables the recipient of the data frames to extract information from the data frames. In digital image technology and digital video technology, data frames typically include rows and columns of numbers representing pixel values. Each data frame may have a frame header that includes identification information (e.g., time stamp, frame number, pixel count, etc.). In some protocol implementations, the frame header may be required, according to an embodiment. Each data frame may include a frame body that includes the data to be transmitted (e.g., pixel values). Various types of formats of data frames (custom or standardized) may be used, as is understood by those having ordinary skill in the art.

According to one embodiment of the disclosure, the drive scheme module 122 formats the image data frames 140 into MIPI image frame. The MIPI image frames are modified to replace some of the pixels of an image frame with drive scheme (control structure) information. While MIPI image frames are one specific example implementation, other image or video formats may also be used by the drive scheme module 122. Examples of other image or video formats that may be used or modified for the concurrent transmission of drive scheme and image data, include, but are not limited to, HDMI (high-definition multimedia interface), DP (display port), PCI-express, USB, Ethernet, and Wi-Fi. The number of pixels that are replaced with drive scheme may be defined by the number of bytes used to define the drive scheme (e.g., 256 bytes).

Figure 4:
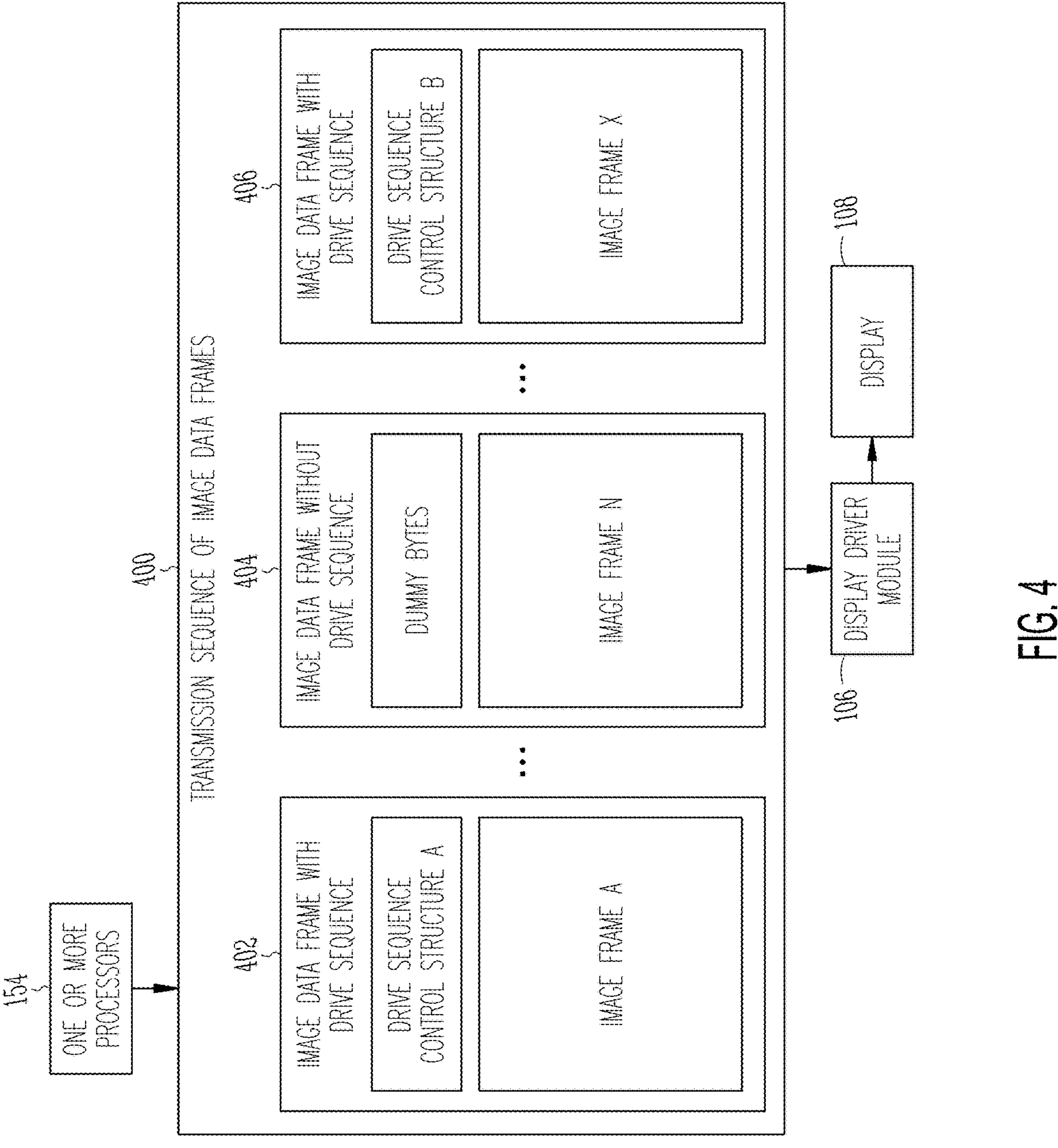
FIG. 4 is an example of a diagram of a transmission sequence of merged image frames, in accordance with an embodiment of the present invention.

Each of the image data frames 140 for the merged image data 132 may include a number of bytes reserved for the drive scheme 134 and a number of bytes reserved for the image data 128. As each of the image data frames 140 is transmitted from the drive scheme module 122 to the display driver module 106, the drive scheme 134 is transmitted with the image data 128, according to an embodiment. By transmitting the drive scheme 134 along with the image data 128, the drive scheme module 122 may enable dynamic reconfiguration of display characteristics. If the drive scheme 134 that is selected by the drive scheme module 122 is the same as a previously transmitted drive scheme 134, then the drive scheme 134 may not be re-transmitted and the number of bytes in the image data frames 140 that are used by the drive scheme 134 may go unused. The drive scheme 134 portion of the image data frames 140 may be referred to as a control structure because the information may ultimately be used to control how the image data is displayed by a display 108. An example of image data frames using reserved bytes for the drive scheme 134 is illustrated in FIG. 4 and is described in further detail below. The drive scheme algorithm 130 may transmit the image data frames 140 to the display driver module 106 at rates of 60, 120, 240, etc. frames per second, as is understood by those having ordinary skill in the art.

Figure 5:
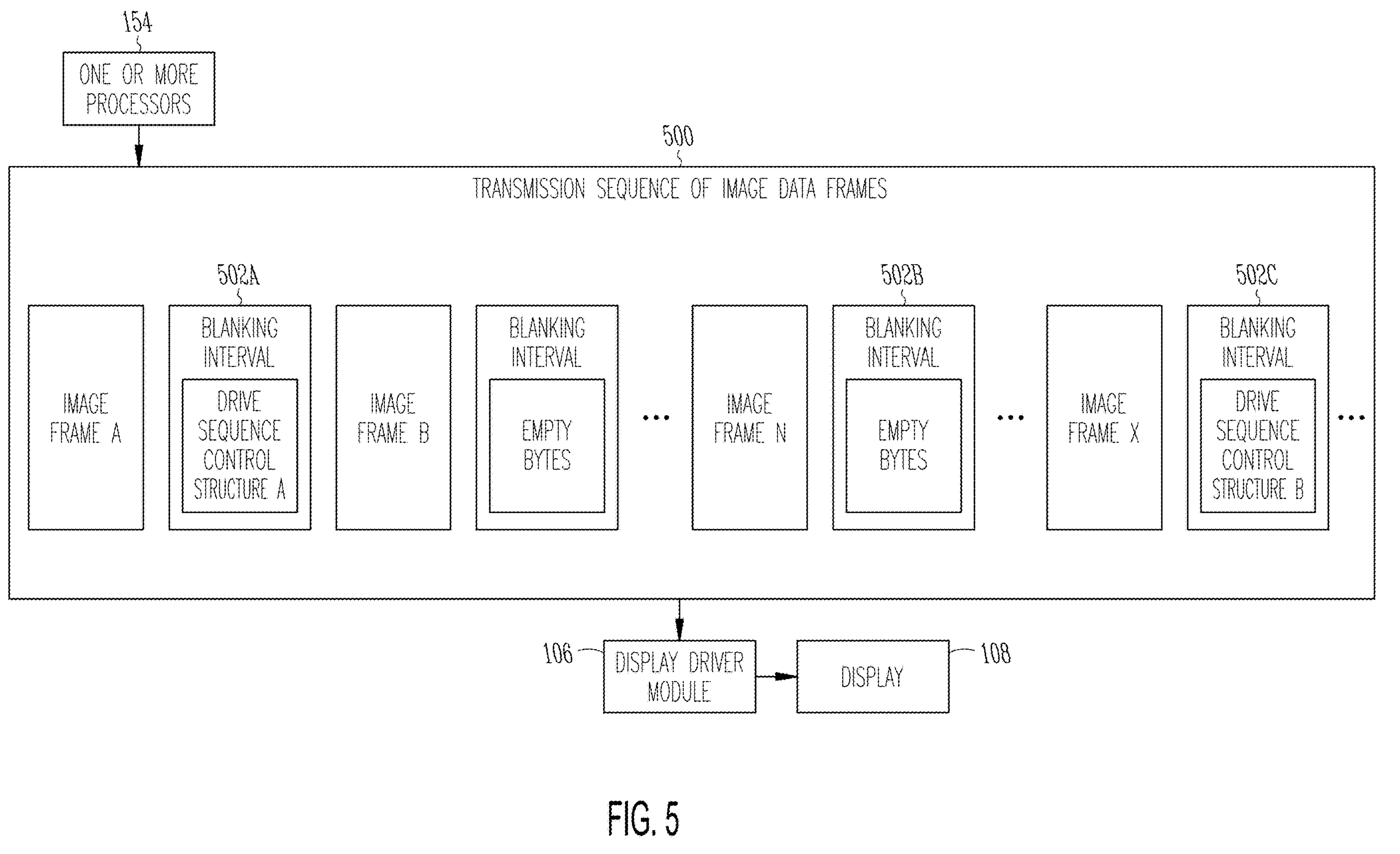
FIG. 5 is an example of a transmission sequence of merged image frames, in accordance with an embodiment of the present invention.

The drive scheme module 122 may cause the image system 100 to employ other techniques to transmit the drive scheme 134 to the display driver module 106. As an example, some communication protocols include the transmission of unused data frames as buffers between image frames. In an embodiment, the drive scheme module 122 causes the image system 100 to insert the drive scheme 134 into the unused buffer data frames that are included between image frames. An example of a communication protocol that transmits unused data frames as a buffer or as blanking intervals is the MIPI protocol. In an embodiment, the drive scheme module 122 inserts the drive scheme 134 into the blanking intervals of a MIPI protocol data frames to transport the drive scheme 134, with the image frame 128 to the display driver 106. An example of image data frames using blanking intervals to carry the drive scheme 134 is illustrated in FIG. 5 and is described in further detail below. By transmitting the drive scheme 134 within the blanking intervals between the image data 128, the drive scheme module 122 enables dynamic reconfiguration of display characteristics.

The drive scheme module 122 causes the image system 100 to transmit the image data frames 140 over the communication channel 142 to the display driver 104, according to an embodiment. The drive scheme module 122 may transmit the image data frames 140 over the communication channel 142 in one or more of a number of formats. Examples of formats include HDMI (high-definition multimedia interface), MIPI, DP (display port), PCI-express, USB, Ethernet, and the like. The communication channel 142 may be a wired or wireless communication channel (e.g., USB, PCI-express, Wi-Fi, etc.).

The display driver module 106 may be configured to receive the image data frames 140 and control the display 108 with the drive scheme 134 included in the image data frames 140. The display driver module 106 may also provide the image data 128 to the display 108, so the image data 128 may be displayed by the display 108 for user viewing. The display driver module 106 may be configured to reconfigure the display 108 with display characteristics included in the drive scheme 134, while providing an uninterrupted displaying of the image data 128.

To dynamically reconfigure display characteristics within the image system 100, the display driver module 106 includes a parser module 144 and an image output module 146. The parser module 144 includes a parser algorithm 148 that may perform several operations within the parser module 144 that may enable the display driver module 144 to both process image data 128 and the drive scheme 134, to support dynamically updating the display without interruption to displaying image data. The parser algorithm 148 may cause the display driver module 106 to receive the image data frames 140 with the display driver module 106. The parser algorithm 148 may cause the display driver module 106 to parse or separate the drive scheme 134 and the image data 128 from the image data frames 140. The parser algorithm 148 may cause the display driver module 106 to store the drive scheme and the image data 128, e.g., temporarily, prior to providing the image data 128 to the display 108.

The parser algorithm 148 may include instructions for a number of operations for separating the drive scheme 134 and the image data 128 from the image data frames 140. Examples of operations may include, but are not limited to, receive the data frames 140, search the data frames 140 for one or more synchronization bytes that identify a portion (e.g., the first row) of a data frame, and map portions (e.g., bytes, rows, columns, etc.) of the data frames 140 to predetermined variables (e.g., data resolution, command details, a portion of a look up table, a pixel in an image frame, etc.). The operations may include using the variables to perform sub-operations, such as separating the drive scheme 134 from the image data 128.

Upon separation of the drive scheme 134 from the image data frames 140, the parser algorithm 148 may cause the display driver module 106 to store the drive scheme 134 in drive scheme storage 150, according to an embodiment. The drive scheme storage 150 may be volatile or nonvolatile memory within the display driver module 106. The drive scheme storage 150 may also be implemented as volatile or nonvolatile memory that is allocated for use by the display driver module 106 within the image system 100.

Upon separation of the image data 128 from the image data frames 140, the parser algorithm 148 may cause the image system 100 to store the image data 128 in an image data store 152. The image data store 152 may be implemented as volatile or nonvolatile memory that is allocated for use by the display driver module 106.

The display driver module 106 includes an image output module 146 that reconfigures image display settings on the display 108 and that provides the image data 128 to the display 108 to display the image data 128 on the display 108. The image output module 146 may be configured to read the drive scheme 134 from the drive scheme storage 150. The image output module 146 may be configured to read the image data 128 from the image data store 152. The image output module 146 uses display characteristics of the drive scheme 134 to reconfigure the display 108 by providing the display characteristics to the display 108. Consequently, the operation of the display driver module 106, in conjunction with the image data processing module 104, may enable the image system 100 to dynamically reconfigure image display settings for the display 108, without interruption to the image data being displayed by the display 108.

The image system 100 may include one or more processors 154 that are configured to operate the sensor data image acquisition module 101, the image data processing module 104 and the display driver module 106. In one embodiment, a first processor executes the sensor data acquisition module (e.g., instructions of the software module) and the image data processing module 104 and a second processor operates the display driver module 106. The one or more processors 154 represent one or more systems on a chip (SoC), digital signal processors (DSP), graphical processing units (GPU), application-specific integrated circuits (ASIC), and/or other processors, according to various embodiments, and as is understood by those having ordinary skill in the art.

The one or more processors 154 are configured to read and execute the sensor data acquisition module and the image data processing module 104 from a first memory 156, according to an embodiment. The one or more processors 154 are configured to read and execute the display driver module 106 from a second memory 158, according to an embodiment. The first memory 156 and the second memory 158 may be shared or may be independently implemented RAM, flash, other volatile memory, other non-volatile memory, hard disk drives, and/or solid state drives, according to various implementations.

The display 108 represents circuitry or other hardware that may be used to display or otherwise visually represent image data. The display 108 may be implemented as a micro display, a touchscreen, a monitor, a projector, or other display apparatus understood by those of ordinary skill in the art.

Figures 1, 1B, 2:
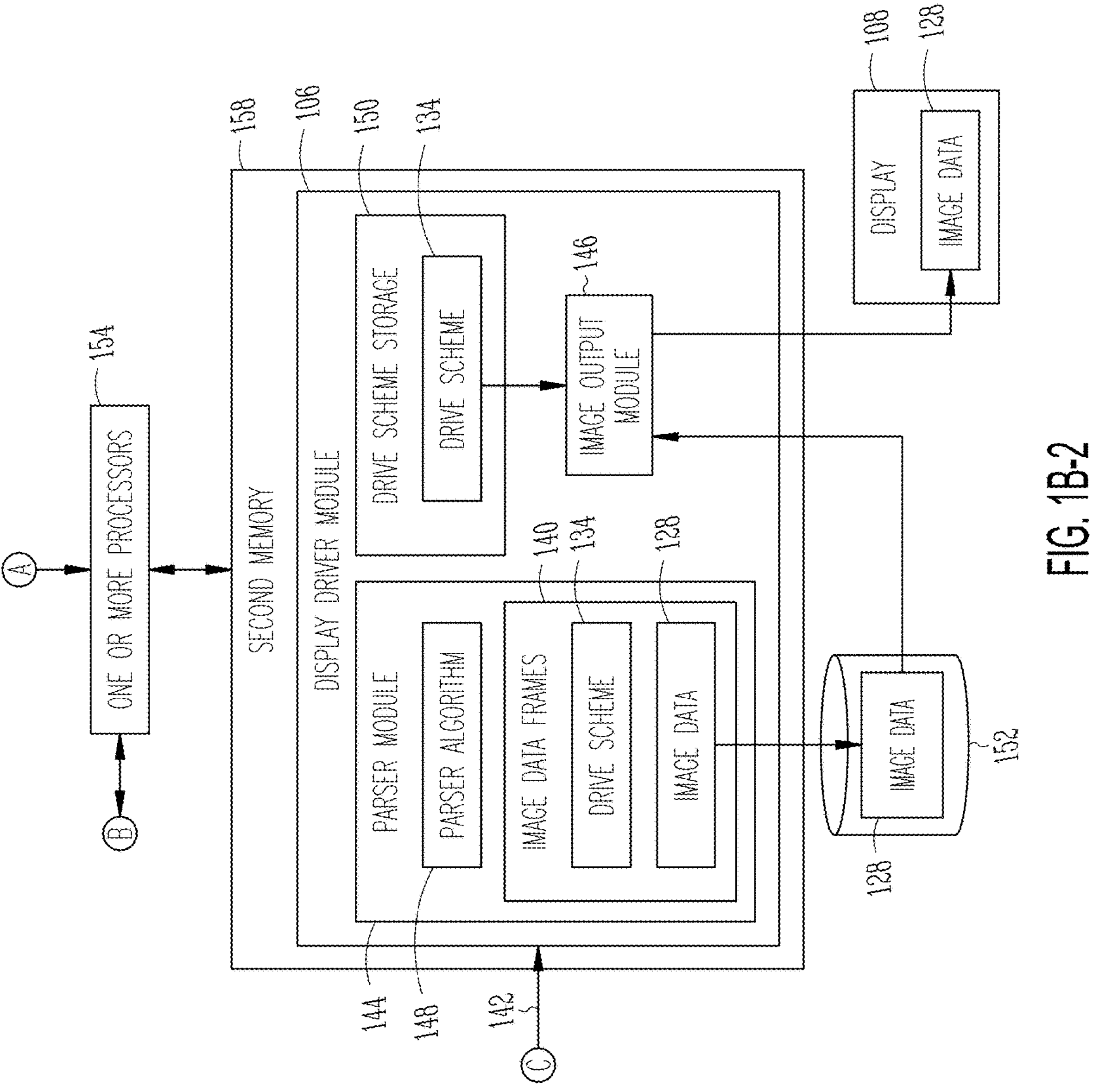
Figure 2:
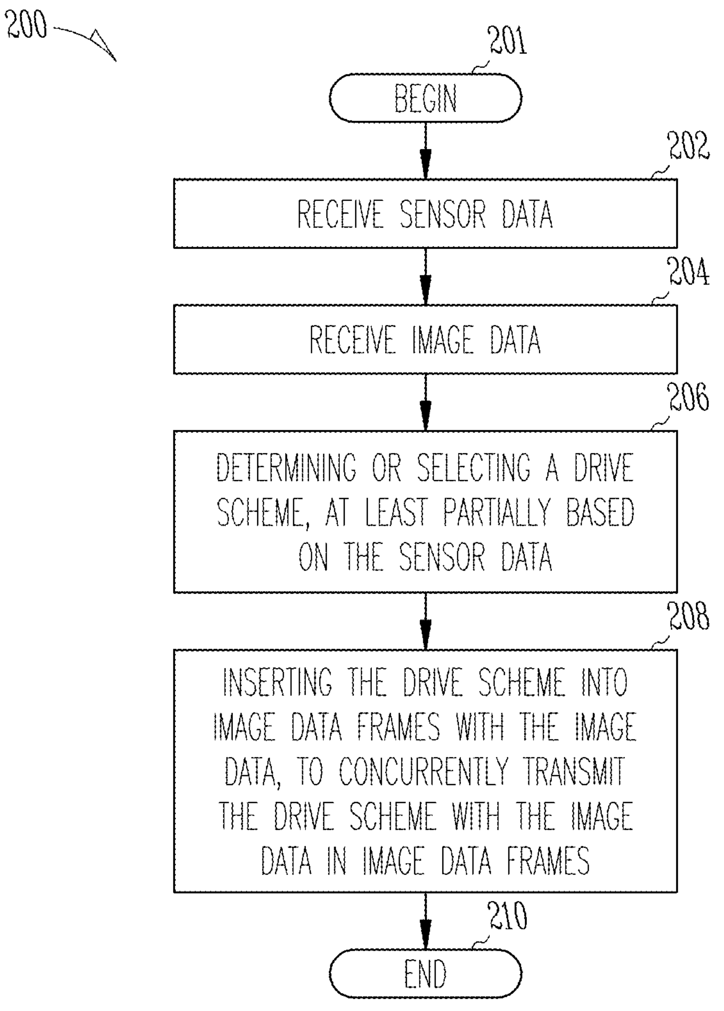

FIG. 2 illustrates a method 200 of merging a drive scheme with image data in an image data frame, according to an embodiment. The method 200 includes operations that may be performed by the sensor data acquisition module 101 and/or the image data processing module 104.

At operation 201, the method 200 begins, according to an embodiment. Operation 201 proceeds to operation 202, according to an embodiment.

At operation 202, the method 200 includes receiving sensor data, according to an embodiment. The sensor data may be received from one or more of a plurality of sensors. The plurality of sensors may include, but are not limited to, an inertial measurement sensor, an ambient light sensor, a temperature sensor, an image sensor, and an eye tracking sensor. The sensor data may be acquired from one or more of the plurality of sensors by a sensor data acquisition (software) module that is configured to request the sensor data directly from the sensors or from one or more units (e.g., an inertial measurement unit, an ambient light unit, a temperature unit, an image unit, an eye tracking unit, etc.) that house the sensors. Operation 202 proceeds to operation 204, according to an embodiment.

At operation 204, the method 200 includes receiving image data, according to an embodiment. The image data may be data that is representative of rows and columns of pixels of a plurality of successively captured images, according to an embodiment. The image data may be requested and acquired with a sensor data acquisition module that is configured to request and/or receive image data from, for example, one or more image sensors. The image data may be acquired by an image data module configured to request and/or receive image data from a network connection, from memory, or from some other location at which the image data is stored or hosted. As discussed above in association with FIG. 1 the image data may be formatted into one or more of a number of image format types. Operation 204 proceeds to operation 206, according to an embodiment.

At operation 206, the method 200 includes defining or selecting a drive scheme, at least partially based on the sensor data, according to an embodiment. The drive scheme may be selected from a plurality of predetermined drive schemes, at least partially based on the sensor data. The drive scheme may be defined, at least partially based on the sensor data (e.g., a different drive scheme may be generated based on sensor data that represents different environmental light levels, different environmental temperatures, various eye movements, etc.). Operation 206 proceeds to operation 208, according to an embodiment.

At operation 208, the method 200 includes inserting the drive scheme into image data frames with the image data, to concurrently transmit the drive scheme with the image data in image data frames, according to an embodiment. By concurrently transmitting the drive scheme with the image data in image data frames, the method 200 may enable an image system to dynamically reconfigure display characteristics, without interrupting the displaying of image on a display to a user. Operation 208 proceeds to operation 210, where the method 200 ends, according to an embodiment.

As an illustrative example, if an ambient light sensor indicates that an image system is being used in a low-light environment (e.g., in the dark), the method 200 may generate, select, or otherwise determine to use a drive scheme that decreases the illumination intensity of a display or of the image data displayed by the display. As another example, if an eye tracking sensor indicates that a user's eyes are directed to the left of a display, the method 200 may generate, select, or otherwise determine to use a drive scheme that increases the focus or resolution of objects displayed on the left side of the display while decreasing the focus or resolution of objects displayed on the right side of the display, to enhance the immersive effect for the user and to personalize a user's experience while viewing the display, according to an embodiment.

Figure 3:
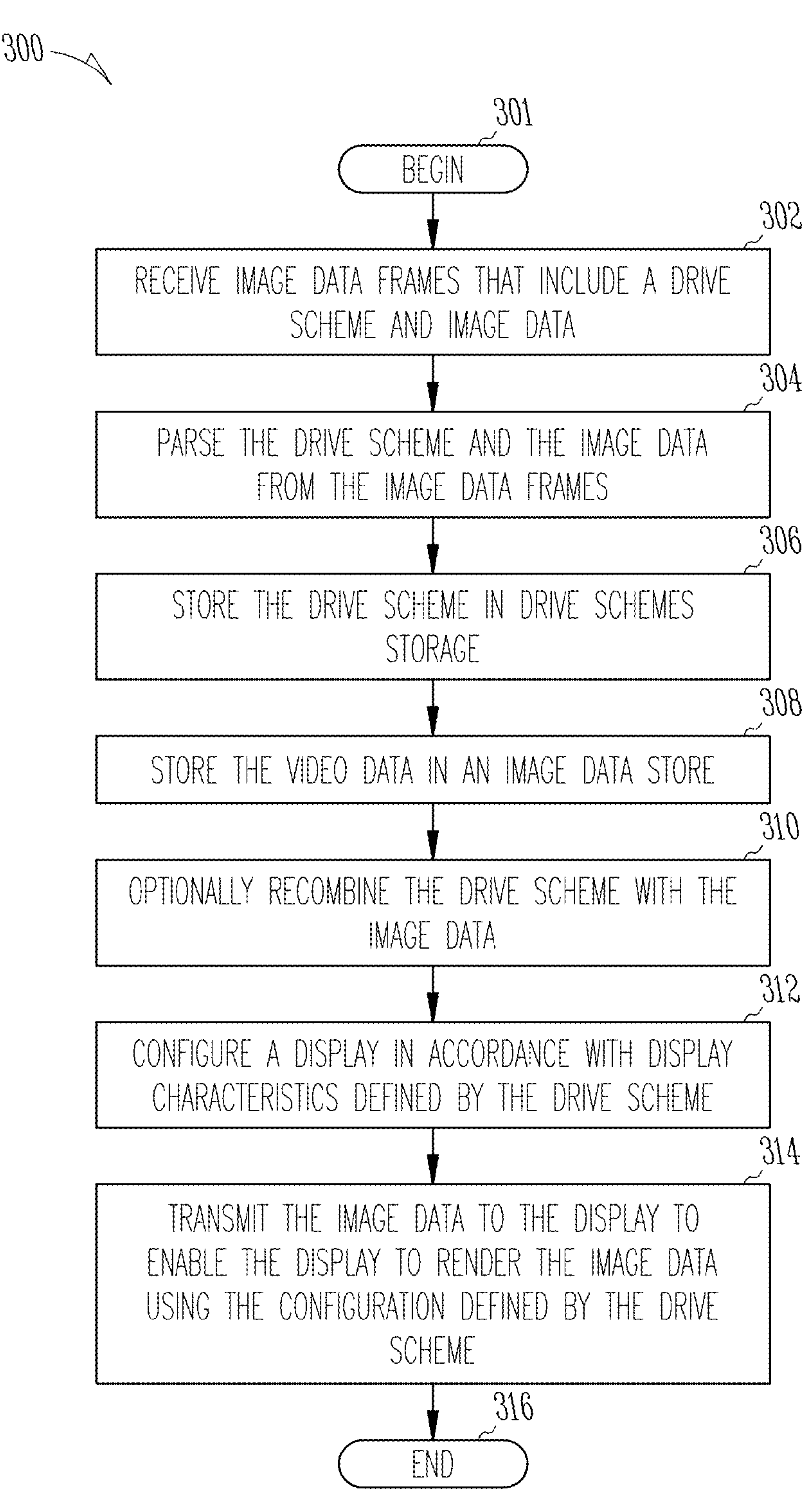
FIG. 3 is an example of a simplified flow diagram of a parser algorithm, in accordance with an embodiment of the present invention.

FIG. 3 illustrates a method 300 of operating a display driver module, such as the display driver module 106 (shown in FIG. 1), according to an embodiment. The method 300 of operating a display driver module is an example of the operations performed, at least in part, by the parser algorithm 148 (shown in FIG. 1).

At operation 301, the method 300 begins, according to an embodiment. Operation 301 proceeds to operation 302, according to an embodiment.

At operation 302, the method 300 includes receiving image data frames that include a drive scheme and image data, according to an embodiment. The drive scheme includes display characteristics for reconfiguring a display to display the image data in a particular manner. The image data may be formatted image data that is been formatted using one or more of a number of existing image data formatting techniques, as known by those of skill in the art. Operation 302 proceeds to operation 304, according to an embodiment.

At operation 304, the method 300 includes parsing the drive scheme and the image data from the image data frames, according to an embodiment. The display drive module may parse or separate the image data and the drive scheme from the image data frames using a number of techniques known to those of skill in the art. In one implementation, the display drive module includes hard-coded mapping of which bytes in the image data frame represent specific control structure settings and which bytes represent image data. The display drive module may save the values of the bytes into (software) variables that are used to perform additional operations (e.g., store, transmit, etc.) the information contained within the image data frames. Operation 304 proceeds to operation 306, according to an embodiment.

At operation 306, the method 300 includes storing the drive scheme in drive schemes storage, according to an embodiment. The drive schemes storage may include volatile and/or nonvolatile memory included within or allocated for use by a display driver module. Operation 306 proceeds to operation 308, according to an embodiment.

At operation 308, the method 300 includes storing the image data in an image data store, according to an embodiment. The image data store may include volatile and/or nonvolatile memory that is allocated for use by the display driver module. Operation 308 proceeds to operation 310, according to an embodiment.

At operation 310, the method 300 includes optionally recombining the drive scheme with the image data (e.g., formatted image data), according to an embodiment. An image format module may be used to recombine the drive scheme with the image data. Operation 310 proceeds to operation 312, according to an embodiment.

At operation 312, the method 300 includes configuring a display in accordance with display characteristics defined by the drive scheme, according to an embodiment. Operation 312 proceeds to operation 314, according to an embodiment.

At operation 314, the method 300 includes transmitting the image data to the display to enable the display to display the image data using the configuration defined by the drive scheme, according to an embodiment. The display may be a micro display, a projector, a touchscreen, a monitor, an AV headset, a VR headset, or another display known to those of ordinary skill in the art. Operation 314 proceeds to operation 316 where the method 300 ends, according to an embodiment.

FIG. 4 illustrates an example of a transmission sequence of image data frames 400, according to an embodiment. The transmission sequence of image data frames 400 is transmitted by the one or more processors 154 to the display driver module 106 for displaying on the display 108, according to an embodiment. The transmission sequence of image data frames 400 may include an image data frame with a drive sequence 402, an image data frame without a drive sequence 404, and an image data frame with a drive sequence 406, according to an embodiment. The image data frame with a drive sequence 402 includes a drive sequence control structure A and an image frame A that are merged together for transmission between the one or more processors 154 and the display driver module 106, according to an embodiment. The image data frame with a drive sequence 402 may be an enlarged image frame that has the capacity to contain both a drive sequence control structure and an image frame, according to an embodiment.

The image data frame without a drive sequence 404 may include dummy bytes and an image frame N, according to an embodiment. The dummy bytes are placeholders for subsequent drive sequence control structures, and the image frame N represents one or more image frames that are transmitted from the one or more processors 154 to the display driver module 106, according to various embodiments.

The image data frame with a drive sequence 406 includes a drive sequence control structure B and an image frame X that are merged together for transmission between the one or more processors 154 and the display driver module 106, according to an embodiment. The drive sequence control structure B is representative of a drive sequence control structure that is transmitted to the display driver module 106 sometime after the drive sequence control structure A, to dynamically change the display characteristics/settings by which image data is displayed on the display 108, according to an embodiment.

FIG. 5 illustrates another example of a transmission sequence of image data frames 500, according to an embodiment. In the transmission sequence of image data frames 500 that is illustrated in FIG. 5, the drive sequence control structure A and the drive sequence control structure B are embedded in a blanking interval that is between image frames, according to an embodiment. The blanking intervals 502 (including, blanking intervals 502A, 502B, 502C) represent bytes that are unused or under-utilized, but that may be required by one or more communications protocols, such as MIPI, according to an embodiment. Although the communication protocol MIPI uses blanking intervals 502, other communication protocols may require buffer bytes, padding bytes, or other under-utilized space that may be used to transport drive sequence control structures between the one or more processors 154 and the display driver module 106, according to an embodiment.

Similar to the transmission sequence of FIG. 5, embodiments of the present disclosure may be used to support some form of lossy image compression, by packing control data differently from the image data, but still coupled to the image data itself for that frame. In other words, instead of occupying image data bytes with the drive scheme, other portions of the image or data format or protocol may be modified to include the drive scheme in order to support dynamically updating drive scheme for a display. For example, in the MIPI DSI ("MIPI display serial interface") protocol, the transmit host has the ability to send not only image data (in packet-types called RGB24 packets for example), but other packet types as well, as known by those of ordinary skill in the art. Some packet types for image would also include vsync-start and vsync-end, hsync-start and hsync-end, as well as dummy/blank/no-op packets during the times between when image data for a line is transported over the MIPI link. By sending the protocol-defined series of vsync/hsync/rgb24 packets, the MIPI transmitter essentially encodes an array of the image frame data. This is how image is typically transported over MIPI for cell-phone display, for example, because most display driver chips that receive this MIPI information will attempt to directly recreate the image stream from the packet-types received.

Other packet types may be used during the information transmission time and may be used to transmit drive sequence control structures, e.g., when RGB24 packets are not being sent, or when normally the host's MIPI TX machine would send blank/No-Op packets. Blank/No-Op packets simply serve as placeholders to allow time to pass on the receiver side when it is recreating the image data frames. In an embodiment of the present invention, rather than sending blank packets, during the frame, a processor may send packets instead that take the same amount of time as the blank packets to transmit (thereby preserving the timing on the receive side), but the packets would have the drive-sequence encoded into them such that the display driver/receiver would extract the control information and store it in memory for use on that frame of image data that is presently being received. Like MIPI, HDMI's protocol has something similar. In this manner, an HDMI cable can carry both image and audio information. The audio is encoded into different packet types that consume time that is normally dummy packets during the blanking intervals.

Alternatively, if 4 lanes of MIPI exist, for example, all 4 lanes may be sent at the same time. The image system might use lanes 0, 1, 2 to carry the image data as a normal "dumb" display might want to receive and may reserve lane 3 for dedicated use by control-information. All 4 lanes are synchronized in the host MIPI transmitter and are processed and sent out together, but one lane would have control-data (e.g., the control structure) while the other 3 may include image data. This would be different than inserting packets into blanking intervals 502, and having the entire set of packets spread over all 4 MIPI lanes, according to an embodiment.

FIGS. 6A and 6B illustrate an example of an image data frame 600 for transmitting a drive sequence between the one or more processors 154 (shown in FIGS. 1, 4, and 5) and the display driver module 106 (shown in FIGS. 1, 4, and 5), according to an embodiment. The image data frame 600 is an example implementation of the image data frames 140 (shown in FIG. 1). The image data frame 600 includes a control structure header 602, a control structure 604, and an image frame 606, according to an embodiment.

A frame of image can be considered a "packet" of data sent over a medium that delivers a bit-stream at a certain rate into the display driver module 106. This packet has a variable structure, but there may be a header for instructing the display driver module 106 on how to further decode the incoming data and control the LCOS (liquid crystal on silicon) channels in the display driver module 106. There can be zero, one, or more command-control structures, and zero, one, or more bit-planes. A bit-plane is a set of bits that correspond to a given bit position within the control structure 604 or within the image frame 606. The control structure 604 may include the command contents, look-up table (LUT) contents and/or serial peripheral interface (SPI) contents for each channel of the display driver module 106. The bit-planes may be allocated for a specific channel or may be marked as "invalid", so as to effectively insert a delay in the input bit-plane transfer cadence.

The display driver 104 and the MIPI data-structure is flexible enough to support various different usage scenarios. One implementation may include an initial setup of the LCOS channels (control structures only, with 0 bit-planes) followed only by bit-planes (and no control structures) for reduced latency and maximal usage of bandwidth. In an embodiment, the display driver 104 may support a new setup of the LCOS channel(s) every frame by inserting control structures and bit-planes in every frame.

The MIPI "packet" structure may be based on 24-bits of data. 24 bits may be used to represent a single "pixel" in what would can be considered as the "active-image portion" of the MIPI data-stream. 24 bits may be split into 8 bits to represent red, 8 bits to represent green, and 8 bits to represent blue. Alternative bit quantities and/or color allocations may also be used.

The image data frame 600 is not to scale but visually illustrates an example ordering and size of a MIPI "frame of image". As illustrated, the smallest bit-length variable represented in the image data frame 600 represents a 24-bit "pixel", i.e., 3 bytes that are allocated for the representation of pixel data for a single pixel. The width of the illustrations of FIGS. 6, 7A, 7B, and 7C is not to be limiting on implementations of the disclosed technology sent over MIPI. For variables and data in the control structure 604 that use multiple "pixels" to transmit the data, the left-most "pixel" may be allocated as the least-significant portion of the variable. For bit-plane data, the left-most "pixel" may be allocated as bits 23:0 of the bit-plane. The second "pixel" may be allocated as bits [47:24], and so-on.

In an embodiment, the reserved 3 bytes of data that would have been used for "pixels" in the diagram may be used for alignment (e.g., to make the decoding easier for a parser).

The control structure header 602 is an example implementation of a portion of the drive scheme and drive sequence control structure (shown in FIGS. 1A, 1, 4, and 5). The control structure header 602 may include a number of features to facilitate merging a drive scheme with image data. The control structure header 602 may include, for example, 8×24-bit "pixels" worth of information present in every MIPI "frame of image". The control structure header 602 may include a signature (e.g., 48-bits) that may be used as a check to ensure image received on the MIPI interface is of the correct format. If 2 "pixels" of the signature arrive on the MIPI interface, the first "pixel" worth of information that arrives may be considered the lower 24-bits of a 48-bit signature, and the second "pixel" worth of information that arrives may be treated as the upper 24-bits of a 48-bit signature. The control structure header 602 may include a control structure count that includes a number of bits (e.g., 24-bits) to specify how many control structures are to follow, which may indicate to the parser how many bytes of data are to be interpreted as control structure. The control structure header 602 may include data structure counts that include a number of bits (e.g., 24-bits) to specify how many valid and invalid data-structures are in the image frame, which may indicate to the parser how many bytes of data are to be interpreted as control structure. The control structure header 602 may include LCOS channel control that includes a number of bits (e.g., 24-bits) that contain information to control the operation of LCOS channels for a frame. The control structure header 602 timebase reset delay that includes a number of bits (e.g., 24-bits) that specify a number of "ticks" from reception of this value until the timebase is reset. When 0, the timebase may be immediately reset. The control structure header 602 data details that includes a number of bits (e.g., 24-bits) to specify the format of data "packing" in the data-structure. The control structure header 602 may include data resolution that includes a number of bits (e.g., 24-bits) to specify a resolution of the data-structure contents.

The control structure 604 may include a number of features to merge a drive scheme with image data. The control structure 604 may include a channel ID that includes a number of bits (e.g., 24-bits) to specify details of the control structure format, which may indicate to the parser how many bytes of data are to be interpreted as control structure. The control structure 604 may include cmd details that include a number of bits (e.g., 24-bits) to parse and store the command-fifo entries. The control structure 604 may include LUT details that include a number of bits (e.g., 24-bits) to parse and store the LUT entries. The control structure 604 may include serial peripheral interface (SPI) details that include a number of bits (e.g., 24-bits) to parse and store the SPI commands. The control structure 604 may include a command list that includes a number of commands (e.g., up to 4096 commands) to be stored into the channels command fifo (first in first out buffer). The control structure 604 may include a LUT list that includes a number of LUT-values (e.g., up to 1024 LUT-values) to be stored into the specified instance of the channel's LUT fifo. The control structure 604 may include an SPI list that includes a number of SPI entries (e.g., up to 256 SPI entries) to be stored into the channel's SPI fifo.

The image frame 606 may include a number of features to merge a drive scheme with image data. The image frame 606 may include datastruct details that includes a number of bits (e.g., 24-bits) to specify details of the data-structure, which may indicate to the parser how many bytes of data are to be interpreted as image data. The image frame 606 may include a datastruct pixel count that includes a number of pixels that are in a subsequent data-structure, which may indicate to the parser how many bytes of data are to be interpreted as image data. The image frame 606 may include dither kernel values that include a number of bits (e.g., 72-bits) that defines the valid bits and dither kernel entries for applying to the data in the data-structure. The image frame 606 may include rotate storage addresses that include a number of bits (e.g., 48 bits) representing addresses for where to store the bits in each data-structure. The image frame 606 may include data-structure data that includes a number of bits packed into a pixel (e.g., 24-bits per pixel).

In an example implementation, each control-structure occupies just over 25,000 pixels (25,096 specifically). If the resolution of the image on the MIPI link is ultra high-definition (UHD) (3840×2160), for example, the control structure would occupy about 6.5 lines (or rows) out of 2,160, so about 0.3% of the total amount of data that could be sent embedded in the merged image pixels of this UHD frame. It should be understood by one of ordinary skill in the art that the number of pixels of a display may vary, and thus, the size of the control structure may vary. At 10 Gbps data-rates (on a single MIPI channel using 4 lanes of D-PHY, according to v1.2 of the MIPI protocol), a transfer of 25,000 pixels would take approximately 50 us to transfer. If both the transmitting and receiving interfaces were used at their max C-Phy data-rate (34.2 Gbps), the transfer time of this control information would be only about 17.6 us. According to embodiments of the present disclosure, drive sequences may be dynamically determined (e.g., based on sensor data), dynamically updated (e.g., through transmission in a merged image frame), and enabled on the order of tens of microseconds. These techniques have the potential of revolutionizing AR/VR and other personalized image emersion experiences.

FIGS. 7A, 7B, 7C, and 7D illustrate an example of portions of an image data frame 700 that includes multiple examples of optional control structures for transmitting a drive sequence between the one or more processors 154 and the display driver module 106 (shown in FIG. 1), according to an embodiment. The image data frame 700 includes a control structure header 702, a first control structure 704, a second control structure 706, a third control structure 708, one or more additional control structures, and an image frame 710, according to an embodiment. The above described sections of the image data frame 600 may be similar to the sections of the image data frame 700, according to various embodiments.

Figure 8:
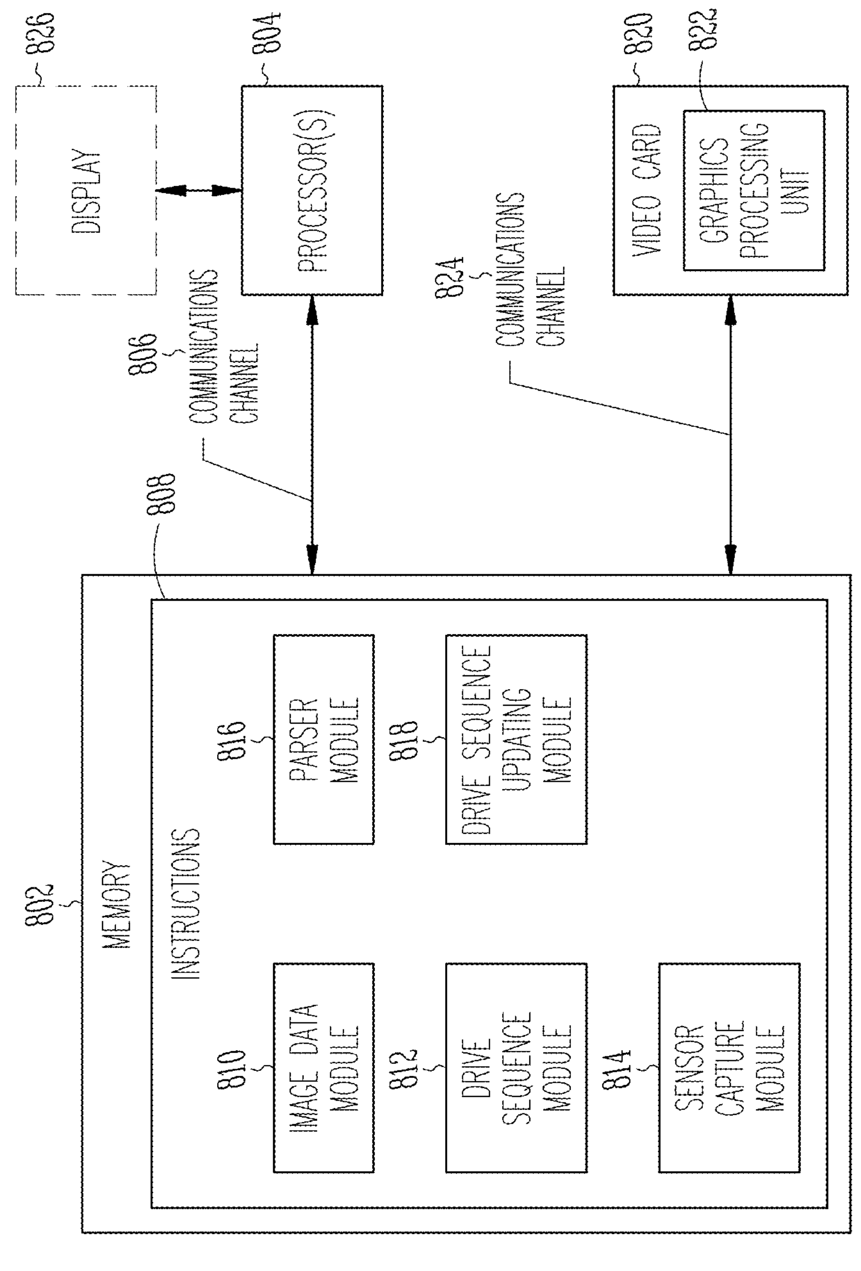
FIG. 8 is an example of a block diagram of modules of an image system, in accordance with an embodiment of the present invention.

FIG. 8 illustrates a block diagram that includes software modules of an image system 800, consistent with embodiments of the present disclosure. The image system 800 includes memory 802 communicatively coupled to one or more processors 804 through a communication channel 806, according to an embodiment. The memory 802 may include, for example, volatile memory (e.g., SDRAM), nonvolatile memory (e.g., NAND), or combination of volatile memory and nonvolatile memory, according to an embodiment. The one or more processors 804 may include two or more discrete processors (e.g., one processor for an SoC and one processor for a display driver), according to an embodiment.

The memory 802 includes instructions 808 that may be executed by the one or more processors 804, according to an embodiment. The instructions 808 include an image data module 810, a drive sequence module 812, a sensor capture module 814, a parser module 816, and a drive sequence updating module 818, according to an embodiment. The image data module 810 includes instructions that, when executed by the one or more processors 804, cause the one or more processors 804 to execute image acquisition and/or formatting operations, according to an embodiment. The drive sequence module 812 includes instructions that, when executed by the one or more processors 804, cause the one or more processors 804 to execute a drive sequence algorithm (e.g., the drive sequence algorithm 130 shown in FIG. 1), according to an embodiment. The sensor capture module 814 includes instructions that, when executed by the one or more processors 804, cause the one or more processors 804 to capture sensor data from one or more sensors in an image system, according to an embodiment. The parser module 816 includes instructions that, when executed by the one or more processors 804, cause the one or more processors 804 to execute a parser routine and/or process, as described above, and consistent with embodiments of the present disclosure. The drive sequence updating module 818 includes instructions that, when executed by the one or more processors 804, cause the one or more processors 804 to update an existing drive sequence with a new drive sequence (e.g., in display driver module 106 shown in FIG. 1), according to an embodiment.

The instructions 808 may be read from the memory 802 or the instructions 808 may be partially stored and executed by a graphics card 820 and/or a graphics processing unit 822. The instructions 808 may be read from the memory 802 by the graphics card 820 and/or the graphics processing unit 822 over a communications channel 824. The graphics card 820 may include and carry the graphics processing unit 822. The graphics processing unit 822 may alternatively be carried by the same interconnection circuitry (e.g., a printed circuit board) as the processor 804.

In one embodiment, the image system 800 is optionally implemented on the display 824 (e.g., on or more circuit boards of the display 824). In one embodiment, the processor 804 is coupled to the display 824 to provide image data and to configure the display 824 with image characteristics.

Embodiments of the techniques disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

As used in any embodiment herein, the term "logic" may refer to an application, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. As described above, the software module may include logic that is executed by processor and/or may include circuitry. The term "logic" may also refer to any information having the form of instruction signals and/or data that may be applied to affect the operation of a processor. Software is one example of such logic. Examples of processors are computer processors (processing units), microprocessors, digital signal processors, controllers and microcontrollers, etc. Logic may be formed from computer-executable instructions stored on a non-transitory computer-readable medium such as memory or storage, including, for example, random access memory (RAM), read-only memories (ROM), erasable/electrically erasable programmable read-only memories (EPROMS/EEPROMS), flash memories, etc. Logic may also comprise digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip, system-on-chip (SoC), etc. In some embodiments, the circuitry may be formed, at least in part, by at least one processor executing code and/or instructions sets (e.g., software, firmware, etc.) corresponding to the functionality described herein, thus transforming a general-purpose processor into a specific-purpose processing environment to perform one or more of the operations described herein.

A processor may include a commercially available processor such as a Celeron, Core, or Pentium processor made by Intel Corporation, a SPARC processor made by Sun Microsystems, an Athlon, Sempron, Phenom, or Opteron processor made by AMD Corporation, other commercially available processors and/or other processors that are or will become available. Some embodiments of a processor may include what is referred to as multi-core processor and/or be enabled to employ parallel processing technology in a single or multi-core configuration. For example, a multi-core architecture typically comprises two or more processor "execution cores". In the present example, each execution core may perform as an independent processor mat enables parallel execution of multiple threads. In addition, those of ordinary skill in the related will appreciate that a processor may be configured in what is generally referred to as 32 or 64 bit architectures, or other architectural configurations now known or that may be developed in the future. A processor typically executes an operating system, which may be, for example, a Windows type operating system from the Microsoft Corporation; the Mac OS X operating system from Apple Computer Corp.; a Unix or Linux-type operating system available from many vendors or what is referred to as an open source; another or a future operating system; or some combination thereof. An operating system interfaces with firmware and hardware in a well-known manner, and facilitates the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, and communication control and related services, all in accordance with known techniques. System memory may include any of a variety of known or future memory storage devices that can be used to store the desired information and that can be accessed by a computer. Computer readable storage media may include non-transitory volatile and non-volatile, removable and nonremovable media implemented in any method or technology for storage of information such as computer readable instructions, data structures, program modules, or other data. Examples include any commonly available random access memory (RAM), read-only memory (ROM), electronically erasable programmable read-only memory (EEPROM), digital versatile disks (DVD), magnetic medium, such as a resident hard disk or tape, an optical medium such as a read and write compact disc, and/or other memory storage device. Memory storage devices may include any of a variety of known or future devices, including a compact disk drive, a tape drive, a removable hard disk drive, USB or flash drive, or a diskette drive. Such types of memory storage devices typically read from, and/or write to, a program storage medium such as, respectively, a compact disk, magnetic tape, removable hard disk, USB or flash drive, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with memory storage device. In some embodiments, a computer program product is described comprising a computer usable medium having control logic (computer software program, including program code) stored therein. The control logic, when executed by a processor, causes the processor to perform functions described herein. In other embodiments, some functions are implemented primarily in hardware using, for example, a hardware state machine. Implementation of the hardware state machine so as to perform the functions described herein will be apparent to those skilled in the relevant arts. Input-output controllers could include any of a variety of known devices for accepting and processing information from a user, whether a human or a machine, whether local or remote. Such devices include, for example, modem cards, wireless cards, network interface cards, sound cards, or other types of controllers for any of a variety of known input devices. Output controllers could include controllers for any of a variety of known display devices for presenting information to a user, whether a human or a machine, whether local or remote. In the presently described embodiment, the functional elements of a computer communicate with each other via a system bus. Some embodiments of a computer may communicate with some functional elements using network or other types of remote communications. As will be evident to those skilled in the relevant art, an instrument control and/or a data processing application, if implemented in software, may be loaded into and executed from system memory and/or a memory storage device. All or portions of the instrument control and/or data processing applications may also reside in a read-only memory or similar device of the memory storage device, such devices not requiring that the instrument control and/or data processing applications first be loaded through input-output controllers. It will be understood by those skilled in the relevant art that the instrument control and/or data processing applications, or portions of it, may be loaded by a processor, in a known manner into system memory, or cache memory, or both, as advantageous for execution. Also, a computer may include one or more library files, experiment data files, and an internet client stored in system memory. For example, experiment data could include data related to one or more experiments or assays, such as detected signal values, or other values associated with one or more sequencing by synthesis (SBS) experiments or processes. Additionally, an internet client may include an application enabled to access a remote service on another computer using a network and may for instance comprise what are generally referred to as "Web Browsers". In the present example, some commonly employed web browsers include Microsoft Internet Explorer available from Microsoft Corporation, Mozilla Firefox from the Mozilla Corporation, Safari from Apple Computer Corp., Google Chrome from the Google Corporation, or other type of web browser currently known in the art or to be developed in the future. Also, in the same or other embodiments an internet client may include, or could be an element of, specialized software applications enabled to access remote information via a network such as a data processing application for biological applications. Computers or processors may be part of a network. A network may include one or more of the many various types of networks well known to those of ordinary skill in the art. For example, a network may include a local or wide area network that may employ what is commonly referred to as a TCP/IP protocol suite to communicate. A network may include a network comprising a worldwide system of interconnected computer networks that is commonly referred to as the internet, or could also include various intranet architectures. Those of ordinary skill in the related arts will also appreciate that some users in networked environments may prefer to employ what are generally referred to as "firewalls" (also sometimes referred to as Packet. Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof. It will be apparent those skilled in the art that various modifications and variation can be made in the present invention without departing from the spirit or scope of the invention. Thus, it is intended that the present invention cover the modifications and variations of this invention provided they come within the scope of the appended claims and their equivalents.

Embodiments of the operations described herein may be implemented in a computer-readable storage device having stored thereon instructions that when executed by one or more processors perform, at least in part, the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

EXAMPLES

Examples of the present disclosure include subject material such as a method, a device, an apparatus, or a system related to driving a display, as discussed below.

Example 1. According to this example, there is provided a method for dynamically updating drive scheme settings to adjust displaying of image data in a display may include receiving image data; determining a drive sequence to apply to a display when displaying the image data; merging the drive sequence with the image data in one or more image data frames; and transmitting the one or more image data frames to a display driver to enable the display driver to configure the display with the drive sequence.

Example 2. This example includes the elements of example 1, wherein the drive sequence is a drive scheme that includes control settings for the display.

Example 3. This example includes the elements of example 1, further comprising: receiving the image data from one or more image sensors, network connections, or memory locations, and wherein merging the drive sequence with the image data includes inserting the drive sequence into rows and/or columns of the one or more image data frames.

Example 4. This example includes the elements of example 1, wherein the one or more image data frames are formatted in at least one of a MIPI (mobile industry processor interface) format, an HDMI (high-definition multimedia interface) format, a DP (display port) format, a PCI-express format, a USB format, an Ethernet format, and a Wi-Fi format.

Example 5. This example includes the elements of example 1, wherein the drive sequence includes at least one of: signal modulation characteristics, color durations for pixels, framerate, color sub-frame rate, bit-depth, color sequential duty-cycle, color-gamut, gamma, persistence, drive-voltages, illumination timing, illumination intensity, timing of individual bit-planes sent to the display, LookUpTables (LUTs), and the serial port interface (SPI) commands.

Example 6. This example includes the elements of example 1, further comprising: receiving sensor data from one or more sensors; determining the drive sequence at least partially based on the sensor data.

Example 7. This example includes the elements of example 6, wherein the sensor data includes at least one of: image sensor data representative of user eye orientation with reference to a display; and data representative of an illumination intensity of an environment in which the display is operating.

Example 8. This example includes the elements of example 1, further comprising: receiving the one or more image data frames; parsing the image data and the drive sequence from the image data frames; configuring the display with the drive sequence; and transmitting the image data to the display to enable to display to display the image data for viewing by a user.

Example 9. This example includes the elements of example 1, wherein determining drive sequence includes selecting the drive sequence from a group of predetermined drive sequence stored by the image system.

Example 10. According to this example, there is provided an image system that may be configured to dynamically update drive scheme settings to adjust displaying image data in a display. The image system may include a sensor data acquisition module to acquire image data. The image system may include a drive scheme module to determine a drive scheme and to merge the drive scheme with image data into one or more image data frames. The image system may include a display driver module to parse the image data and the drive scheme from the one or more image data frames, to display the image data in a display with settings represented by the drive sequence.

Example 11. This example includes the elements of example 10, wherein the sensor data acquisition module acquires sensor data from one or more of a plurality of sensors.

Example 12. This example includes the elements of example 11, wherein the drive sequence module determines the drive sequence at least partially based on the sensor data.

Example 13. This example includes the elements of example 10, wherein merging the drive sequence includes inserting the drive sequence into rows and/or columns of the one or more image data frames.

Example 14. This example includes the elements of example 10, wherein the drive scheme module is executed by a first processor and the display driver module is executed by a second processor.

Example 15. This example includes the elements of example 10, wherein the drive sequence includes at least one of: signal modulation characteristics, color durations for pixels, frame-rate, color sub-frame rate, bit-depth, color sequential duty-cycle, color-gamut, gamma, persistence, drive-voltages, illumination timing, and illumination intensity.

Example 16. According to this example, there is provided an image system to dynamically update a drive scheme to adjust displaying of image data in a display. The image system may include means for identifying image data; means for determining a drive sequence that is applied to a display when displaying the image data; means for merging the drive sequence with the image data in one or more image data frames; and means for transmitting the one or more image data frames to a display driver that enables the display drive to configure the display with the drive sequence.

Example 17. This example includes the elements of example 16, wherein the drive sequence define settings with which the image data is displayed by a display.

Example 18. This example includes the elements of example 16, further comprising: means for receiving sensor data from one or more sensors; means for determining the drive sequence at least partially based on the sensor data.

Example 19. This example includes the elements of example 16, wherein the drive sequence includes at least one of: signal modulation characteristics, color durations for pixels, frame-rate, color sub-frame rate, bit-depth, color sequential duty-cycle, color-gamut, gamma, persistence, drive-voltages, illumination timing, and illumination intensity.

Example 20. According to this example, there is provided a computer readable device storing instructions that, if executed by one or more processors, performs the method of any one of examples 1 to 9.

Example 21. According to this example, there is provided an image system of any one of claims 10 to 15, future comprising processor circuitry.

Example 22. According to this example, there is provided a device comprising means to perform the method of any one of examples 1 to 9.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The invention claimed is:

1. A method comprising:
receiving image data comprising pixel values for display;
determining a drive sequence comprising display settings for configuring operation of a display, the display settings including at least one of drive-voltages, illumination timing, illumination intensity, gamma, or timing of individual bit-planes sent to the display;
processing the image data and the drive sequence to generate a sequence of image data frames formatted in at least one of a mobile industry processor interface (MIPI) format, a high-definition multimedia interface (HDMI) format, a display port (DP) format, a PCI-express format, a USB format, an Ethernet format, or a Wi-Fi format, the sequence of image data frames comprising:
a first plurality of image data frames, each frame of the first plurality comprising at least a control structure of the drive sequence, wherein the control structure is distinct from the pixel values and comprises at least a portion of the display settings; and
a second plurality of image data frames, each frame of the second plurality comprising at least a respective portion of the image data,
the frames of the first plurality sequentially alternating with frames of the second plurality in the sequence of image data frames; and
transmitting the sequence of image data frames to a display driver to enable the display driver to drive the display in accordance with the display settings and to render the pixel values on the display in accordance with the display settings.

2. The method of claim 1, wherein each frame of the first plurality further comprises a respective portion of the image data.

3. The method of claim 1, wherein each frame of the second plurality further comprises one or more dummy bytes.

4. The method of claim 1, wherein each image data frame of the first plurality includes the control structure of the drive sequence in one or both of rows and columns of the image data frame.

5. The method of claim 1, wherein the display settings affect at least one of signal modulation characteristics, color durations for pixels, frame-rate, color sub-frame rate, bit-depth, color sequential duty-cycle, color-gamut, gamma, persistence, drive-voltages, illumination timing, illumination intensity, timing of individual bit-planes sent to the display, LookUpTables (LUTs), or serial port interface (SPI) commands.

6. The method of claim 1, wherein the determining of the drive sequence comprises:
receiving sensor data from one or more sensors; and
determining the drive sequence at least partially based on the sensor data.

7. The method of claim 6, wherein the sensor data comprises at least one of:
image sensor data representative of user eye orientation with reference to a display; or
data representative of an illumination intensity of an environment in which the display is operating.

8. The method of claim 1, further comprising:
receiving the sequence of image data frames at the display driver;
parsing the image data and the drive sequence from the received image data frames;
configuring the display with the drive sequence; and
transmitting the image data to the display to enable the display to display the image data, in accordance with the drive sequence, for viewing by a user.

9. The method of claim 1, wherein the determining of the drive sequence comprises selecting the drive sequence from a plurality of predetermined drive sequences.

10. An image system, comprising:
a drive scheme component to:
receive image data comprising pixel values for display;
determine a drive sequence comprising display settings for configuring operation of a display, the display settings including at least one of drive-voltages, illumination timing, illumination intensity, gamma, or timing of individual bit-planes sent to the display; and
process the image data and the drive sequence to generate a sequence of image data frames formatted in at least one of a mobile industry processor interface (MIPI) format, a high-definition multimedia interface (HDMI) format, a display port (DP) format, a PCI-express format, a USB format, an Ethernet format, or a Wi-Fi format, the sequence of image data frames comprising:
a first plurality of image data frames, each frame of the first plurality comprising at least a control structure of the drive sequence, wherein the control structure is distinct from the pixel values and comprises at least a portion of the display settings; and
a second plurality of image data frames, each frame of the second plurality comprising at least a respective portion of the image data,
the frames of the first plurality sequentially alternating with frames of the second plurality in the sequence of image data frames; and
a display driver component configured to parse the image data and the drive sequence from the sequence of image data frames, and to display the image data in a display in accordance with the display settings and to render the pixel values on the display in accordance with the display settings.

11. The image system of claim 10, further comprising:
a sensor data acquisition component to acquire sensor data from one or more of a plurality of sensors; and
wherein the drive scheme component determines the drive sequence at least partially based on the sensor data.

12. The image system of claim 11, wherein the sensor data comprises at least one of:
image sensor data representative of user eye orientation with reference to a display; or
data representative of an illumination intensity of an environment in which the display is operating.

13. The image system of claim 10, wherein each frame of the first plurality further comprises a respective portion of the image data.

14. The image system of claim 10, wherein each frame of the second plurality further comprises one or more dummy bytes.

15. The image system of claim 10, wherein each image data frame of the first plurality includes the control structure of the drive sequence in one or both of rows and columns of the image data frame.

16. The image system of claim 10, wherein the drive scheme component is executed by a first processor and the display driver component is executed by a second processor.

17. The image system of claim 10, wherein the display settings affect at least one of:

signal modulation characteristics, color durations for pixels, frame-rate, color sub-frame rate, bit-depth, color sequential duty-cycle, color-gamut, gamma, persistence, drive-voltages, illumination timing, or illumination intensity.

18. The image system of claim 10, wherein the determining of the drive sequence comprises selecting the drive sequence from a plurality of predetermined drive sequences.

19. A non-transitory computer readable storage device having stored thereon instructions that when executed by one or more processors result in operations comprising:

receiving image data comprising pixel values for display;

determining a drive sequence comprising display settings for configuring operation of a display, the display settings including at least one of drive-voltages, illumination timing, illumination intensity, gamma, or timing of individual bit-planes sent to the display;

processing the image data and the drive sequence to generate a sequence of image data frames formatted in at least one of a mobile industry processor interface (MIPI) format, a high-definition multimedia interface (HDMI) format, a display port (DP) format, a PCI-express format, a USB format, an Ethernet format, or a Wi-Fi format, the sequence of image data frames comprising:

a first plurality of image data frames, each frame of the first plurality comprising at least a control structure of the drive sequence, wherein the control structure is distinct from the pixel values and comprises at least a portion of the display settings; and a second plurality of image data frames, each frame of the second plurality comprising at least a respective portion of the image data, the frames of the first plurality sequentially alternating with frames of the second plurality in the sequence of image data frames; and transmitting the sequence of image data frames to a display driver to enable the display driver to drive the display in accordance with the display settings and to render the pixel values on the display in accordance with the display settings.

20. The method of claim 1, wherein each frame of the first plurality further comprises a respective portion of the image data.

* * * * *